United States Patent
Sutardja

(10) Patent No.: US 7,760,525 B2
(45) Date of Patent: Jul. 20, 2010

(54) VOLTAGE REGULATOR

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 1000 days.

(21) Appl. No.: 10/693,787

(22) Filed: Oct. 24, 2003

(65) Prior Publication Data

US 2005/0040796 A1    Feb. 24, 2005

Related U.S. Application Data

(60) Provisional application No. 60/496,957, filed on Aug. 21, 2003.

(51) Int. Cl.
*H02M 7/48* (2007.01)

(52) U.S. Cl. ...................... 363/71; 363/21.12

(58) Field of Classification Search ............ 363/16, 363/40, 55, 131, 17–20, 25, 26, 97, 132, 363/133; 327/122, 113, 478, 495, 553, 232
See application file for complete search history.

(56) References Cited

U.S. PATENT DOCUMENTS

| | | | |
|---|---|---|---|
| 3,529,233 A * | 9/1970 | Podell | ............ 323/219 |
| 3,579,214 A | 5/1971 | Solyst | |
| 3,851,375 A | 12/1974 | Koomeef | |
| 4,020,439 A | 4/1977 | Thiessens et al. | |
| 4,040,174 A | 8/1977 | Tsuda | |
| 4,203,081 A | 5/1980 | Braeckelmann | |
| 4,214,198 A | 7/1980 | Schneider | |
| 4,245,286 A | 1/1981 | Paulkovich et al. | |
| 4,273,051 A | 6/1981 | Stratton | |
| 4,384,321 A | 5/1983 | Rippel et al. | |
| 4,475,143 A | 10/1984 | Hernandez | |
| 4,527,032 A | 7/1985 | Young et al. | |
| 4,536,733 A | 8/1985 | Shelly et al. | |
| 4,578,664 A | 3/1986 | Kinzler et al. | |
| 4,583,068 A | 4/1986 | Dickens et al. | |
| 4,616,142 A | 10/1986 | Upadhyay et al. | |

(Continued)

FOREIGN PATENT DOCUMENTS

DE    3622190 A    1/1988

(Continued)

OTHER PUBLICATIONS

Sanchis-Kilders E. et al; "New very low power, high efficiency, DC/DC power supply for Leo satellite constellation"; Power Electronics Specialists Conferences, 1999; pp. 1146-1151.

(Continued)

*Primary Examiner*—Rajnikant B Patel

(57) ABSTRACT

A regulator for converting energy from an input source to a voltage of an output. The regulator comprising at least two conduction switches to conduct energy from the input source to the output. Each of the conduction switches operated at approximately 50% duty cycle. At least two inductors in communication with the at least two conduction switches, the at least two inductors wound together on a common core and each inductor having a polarity such that DC currents in the inductors cancel each other. The inductors having a coefficient of coupling approximately greater than 0.99. At least two freewheeling switches in communication with the at least two conduction switches to provide a path for current during non-conduction periods. A drive signal generator to generate drive signals for controlling the at least two conduction switches.

67 Claims, 11 Drawing Sheets

U.S. PATENT DOCUMENTS

| | | | |
|---|---|---|---|
| 4,675,629 A | 6/1987 | Sakamoto et al. | |
| 4,801,912 A | 1/1989 | McElheny et al. | |
| 4,803,609 A | 2/1989 | Gillett et al. | |
| 4,897,773 A | 1/1990 | Bilczo | |
| 5,006,782 A | 4/1991 | Pelly | |
| 5,079,498 A | 1/1992 | Cleasby et al. | |
| 5,186,647 A | 2/1993 | Denkmann et al. | |
| 5,204,809 A | 4/1993 | Andresen | |
| 5,303,115 A | 4/1994 | Nayar et al. | |
| 5,363,035 A | 11/1994 | Hutchison et al. | |
| 5,402,329 A * | 3/1995 | Wittenbreder, Jr. | 363/16 |
| 5,442,317 A | 8/1995 | Stengel et al. | |
| 5,444,600 A | 8/1995 | Dobkin et al. | |
| 5,475,296 A | 12/1995 | Vinsant et al. | |
| 5,481,238 A | 1/1996 | Carsten et al. | |
| 5,500,629 A | 3/1996 | Meyer | |
| 5,509,691 A | 4/1996 | Kaule et al. | |
| 5,636,107 A | 6/1997 | Lu et al. | |
| 5,654,881 A * | 8/1997 | Albrecht et al. | 363/25 |
| 5,802,709 A | 9/1998 | Hogge et al. | |
| 5,808,537 A | 9/1998 | Kondo et al. | |
| 5,821,832 A * | 10/1998 | Moreau | 333/177 |
| 5,889,373 A | 3/1999 | Fisher et al. | |
| 5,999,417 A | 12/1999 | Schlecht | |
| 6,023,154 A | 2/2000 | Martinez | |
| 6,043,634 A | 3/2000 | Nguyen | |
| 6,049,264 A | 4/2000 | Sailer et al. | |
| 6,054,764 A | 4/2000 | Howser et al. | |
| 6,057,665 A | 5/2000 | Herniter et al. | |
| 6,084,790 A * | 7/2000 | Wong | 363/71 |
| 6,137,389 A | 10/2000 | Uchikoba | |
| 6,144,269 A | 11/2000 | Okamoto et al. | |
| 6,150,798 A | 11/2000 | Ferry et al. | |
| 6,166,527 A | 12/2000 | Dwelley et al. | |
| 6,184,666 B1 | 2/2001 | Boeckmann et al. | |
| 6,191,673 B1 | 2/2001 | Ogura et al. | |
| 6,229,289 B1 | 5/2001 | Piovaccari et al. | |
| 6,246,592 B1 | 6/2001 | Balogh et al. | |
| 6,255,804 B1 | 7/2001 | Herniter et al. | |
| 6,259,235 B1 | 7/2001 | Fraidlin et al. | |
| 6,282,103 B1 * | 8/2001 | Naito et al. | 363/21.12 |
| 6,310,534 B1 | 10/2001 | Brunner | |
| 6,329,801 B1 | 12/2001 | Zuniga et al. | |
| 6,348,744 B1 | 2/2002 | Levesque | |
| 6,356,179 B1 | 3/2002 | Yamada | |
| 6,356,462 B1 | 3/2002 | Jang et al. | |
| 6,362,986 B1 | 3/2002 | Schultz et al. | |
| RE37,738 E | 6/2002 | Brkovic | |
| 6,404,175 B1 | 6/2002 | Yang et al. | |
| 6,459,349 B1 | 10/2002 | Giday et al. | |
| 6,483,623 B1 | 11/2002 | Maruyama | |
| 6,493,242 B1 * | 12/2002 | Riggio et al. | 363/16 |
| 6,512,352 B2 | 1/2003 | Qian | |
| 6,512,437 B2 | 1/2003 | Jin et al. | |
| 6,683,522 B2 | 1/2004 | Walsh | |
| 6,686,823 B2 | 2/2004 | Arntz et al. | |
| 6,703,815 B2 | 3/2004 | Biagi | |
| 6,738,274 B2 | 5/2004 | Prasad et al. | |
| 6,798,177 B1 | 9/2004 | Liu et al. | |
| 6,820,321 B2 | 11/2004 | Harding | |
| 6,822,427 B2 * | 11/2004 | Wittenbreder | 323/282 |
| 6,853,568 B2 * | 2/2005 | Li et al. | 363/65 |
| 6,853,588 B2 | 2/2005 | Kim et al. | |
| 6,967,553 B2 | 11/2005 | Jitaru | |
| 6,995,685 B2 | 2/2006 | Randall | |
| 2001/0052837 A1 | 12/2001 | Walsh | |
| 2002/0039061 A1 | 4/2002 | Timashov | |
| 2002/0118000 A1 | 8/2002 | Xu et al. | |
| 2002/0136029 A1 | 9/2002 | Ledenev et al. | |
| 2003/0111985 A1 | 6/2003 | Xi | |
| 2003/0227366 A1 | 12/2003 | Lin | |
| 2006/0116623 A1 | 6/2006 | Han et al. | |

FOREIGN PATENT DOCUMENTS

| | | |
|---|---|---|
| EP | 0484074 A | 5/1992 |
| EP | 0 632 571 A | 1/1995 |
| EP | 0632571 | 5/1996 |
| EP | 0895257 A | 2/1999 |
| EP | 1 239 574 A2 | 9/2002 |
| GB | 2318691 A | 4/1998 |
| JP | 57193007 | 11/1982 |
| JP | 58224420 A | 12/1983 |
| JP | 61078111 A | 4/1986 |
| JP | 02125404 A | 5/1990 |
| JP | 02251107 | 10/1990 |
| JP | 06260869 | 9/1994 |
| JP | 11008123 | 1/1999 |
| JP | 11074125 A | 3/1999 |
| JP | 11 146638 A | 5/1999 |
| JP | 11204354 A | 7/1999 |
| JP | 20020570039 A | 2/2002 |
| JP | 2002-095166 | 3/2002 |
| JP | 2003332141 A | 11/2003 |
| JP | 2005-252783 | 9/2005 |
| JP | 2008-274582 | 11/2008 |
| WO | WO00/74089 A1 | 12/2000 |
| WO | WO 01/43276 | 6/2001 |
| WO | WO 02/17469 | 2/2002 |
| WO | WO02/095775 A1 | 11/2002 |

OTHER PUBLICATIONS

Wei, Chen et al; "Dual-loop feedback for fast low dropout regulators"; 32nd Annual IEEE Power Electronics Specialists Conference; 2001; pp. 1265-1269.

Communication and partial European Search Report from the European Patent Office dated Oct. 6, 2006 for Application No. 04019981.2-1242.

Communication and partial European Search Report from the European Patent Office dated Oct. 6, 2006 for Application No. 04019963.0-1242.

"Understanding Ferrite Bead Inductors", http://www.murata.com, pp. 23-25 (unknown date of publication).

"Using Ferrite Beads to Keep RF Out of TV Sets, Telephones, VCR's, Burglar Alarms and Other Electronic Equipment," http://www.antennex.com, pp. 1-4 (unknown date of publication).

European Search Report for Application No. 04020571.8, 3 pages.
European Search Report for Application No. 04020568.4, 3 pages.
European Search Report for Application No. 04010841; 2 pages.
European Search Report for Application No. 04011558.6, 2 pages.
Power Converter Topologies, How to Choose the Right One for Your Design; Dennis L. Feucht; Innovatia Laboratories; 2002; 4 Pages.

U.S. Appl. No. 10/621,128, filed Jul. 16, 2003, entitled, "Power Inductor With Reduced DC Current Saturation", pp. 1-33, and 6 sheets of drawings.

U.S. Appl. No. 10/693,787, filed Oct. 24, 2003, entitled, "Voltage Regulator", pp. 1-104, and 11 sheets of drawings.

U.S. Appl. No. 10/744,416, filed Dec. 22, 2003, entitled, "Power Inductor With Reduced DC Current Saturation", pp. 1-39, and 9 sheets of drawings.

U.S. Appl. No. 10/754,187, filed Jan. 8, 2004, entitled, "Digital Low Dropout Regulator", pp. 1-85, and 19 sheets of drawings.

Hayt and Kemmerly, "Engineering Circuit Analysis", 1986, Mcgraw-Hill Book Company, Fourth Edition, pp. 442-443.

Communication from European Patent Office dated Aug. 6, 2007 for Application No. 07 004 458.1-1242; 5 pages.

* cited by examiner

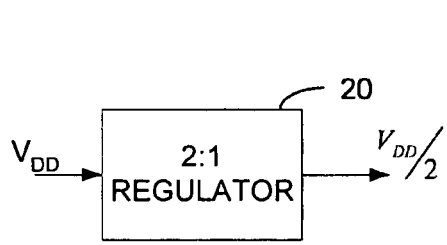
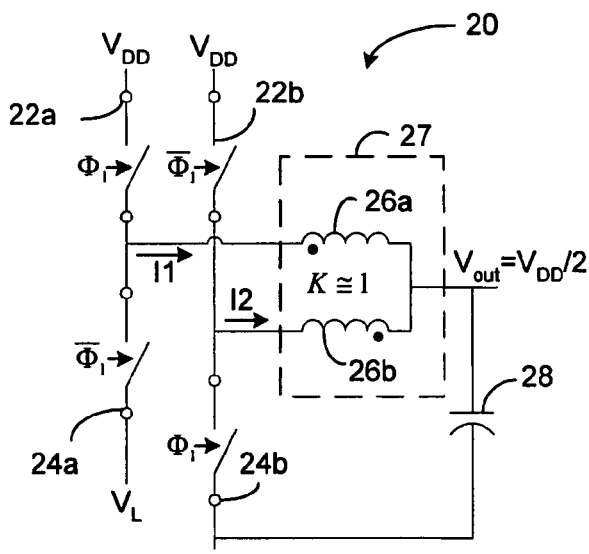
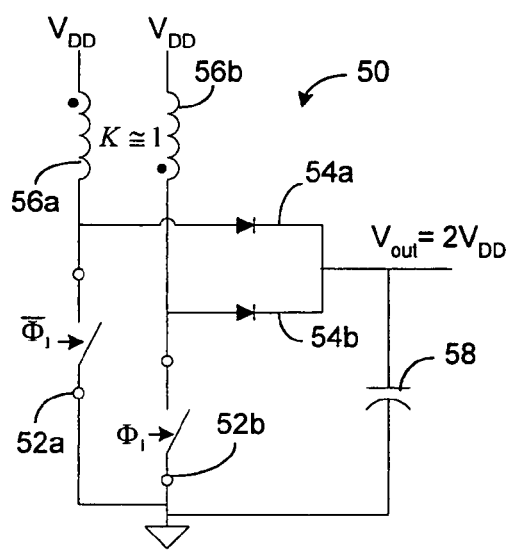
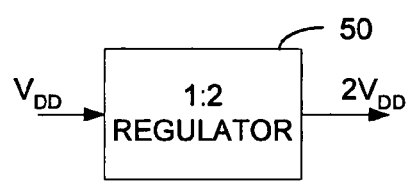
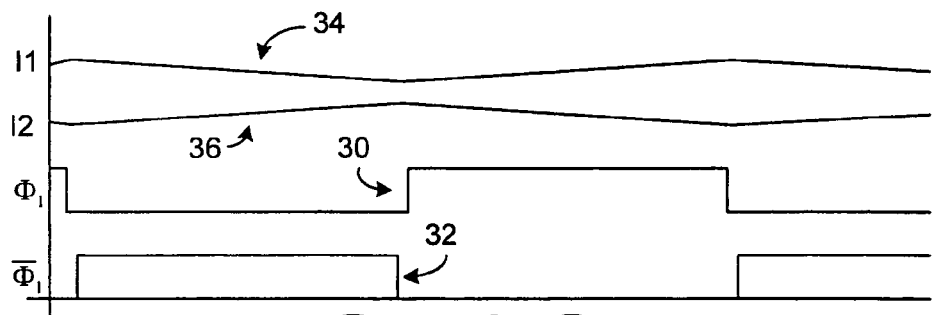

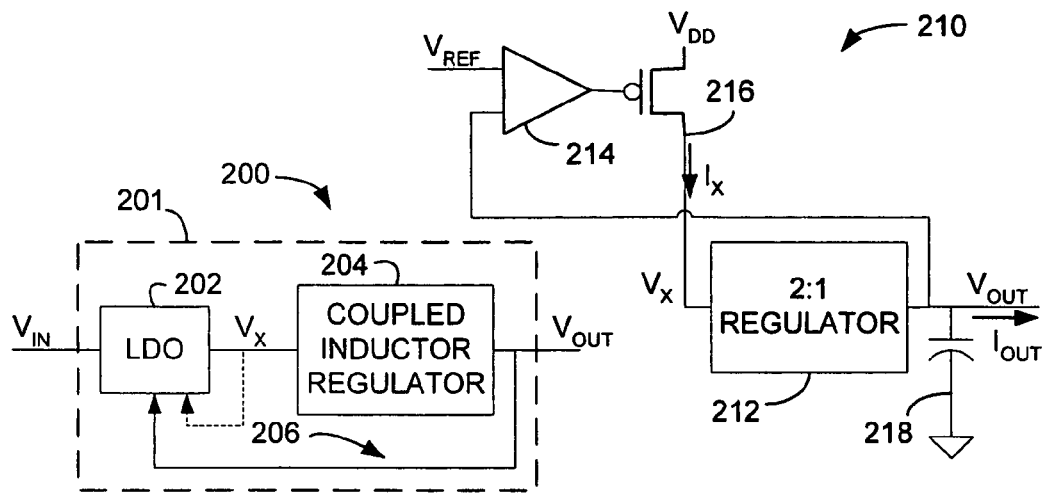
FIG. 7A  FIG. 7B
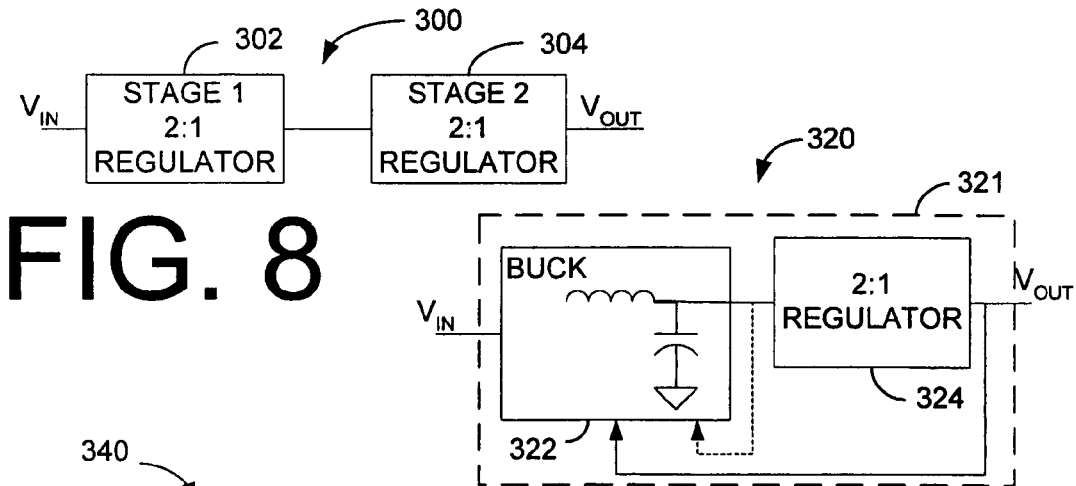
FIG. 8
FIG. 9A
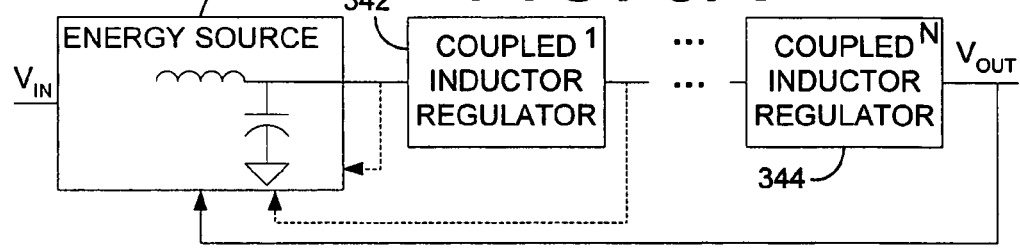
FIG. 10A

VOLTAGE REGULATOR

CROSS-REFERENCE TO RELATED APPLICATIONS

This application claims the benefit of the filing date of U.S. provisional application No. 60/496,957 filed Aug. 21, 2003, the entire contents of which are herein incorporated by reference.

TECHNICAL FIELD

An aspect of this invention relates to power systems for electronic circuits.

BACKGROUND

Modern digital logic devices are now being built using 0.13 um process or smaller technology. These small process devices operate at extremely low voltages, much lower voltages than have been previously used for most devices. In the near future, operation below 1 volt will probably be commonplace. One of the challenges in systems that use these low voltage devices is how to cost effectively interface the main source of energy, such as the 5 volt or 12 volt power supply found in typical systems, to the sub 1 volt devices.

In particular, traditional non-isolated buck DC/DC converters may be too inefficient for converting a 12 volt supply to a 1 volt supply. To regulate an output voltage, traditional buck converters may vary the pulse width of the conduction cycle. To convert 12 volts to 1 volt, the duty cycle of traditional non-isolated buck DC/DC converters may be very small, leading to high conversion losses and low power efficiency.

SUMMARY

A regulator for converting energy from an input source to a voltage of an output. The regulator comprising at least two conduction switches to conduct energy from the input source to the output. Each of the conduction switches operated at approximately 50% duty cycle. At least two inductors in communication with the at least two conduction switches, the at least two inductors wound together on a common core and each inductor having a polarity such that DC currents in the inductors cancel each other. The inductors having a coefficient of coupling approximately greater than 0.99. At least two freewheeling switches in communication with the at least two conduction switches to provide a path for current during non-conduction periods. A drive signal generator to generate drive signals for controlling the at least two conduction switches.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A is a block diagram of an aspect of a 2:1 buck regulator.

FIG. 2B is a circuit diagram of an aspect of a 2:1 buck regulator.

FIG. 2C is a representation of waveforms associated with an aspect of a 2:1 buck regulator.

FIG. 3A is a block diagram of an aspect of a 1:2 boost regulator.

FIG. 3B is a circuit diagram of an aspect of a 1:2 boost regulator.

FIG. 7A is a block diagram of an aspect of a low dropout device combined with a 2:1 Regulator.

FIG. 7B is a schematic diagram of an aspect of a low dropout device combined with a 2:1 Regulator.

FIG. 8 is a block diagram of an aspect of a multi-stage regulator system.

FIG. 9A is a block diagram of an aspect of buck regulator combined with a 2:1 Regulator.

FIG. 10A is a block diagram of an aspect of multiple 2:1 Regulators combined in series with a buck regulator.

DETAILED DESCRIPTION

Figure 1A:
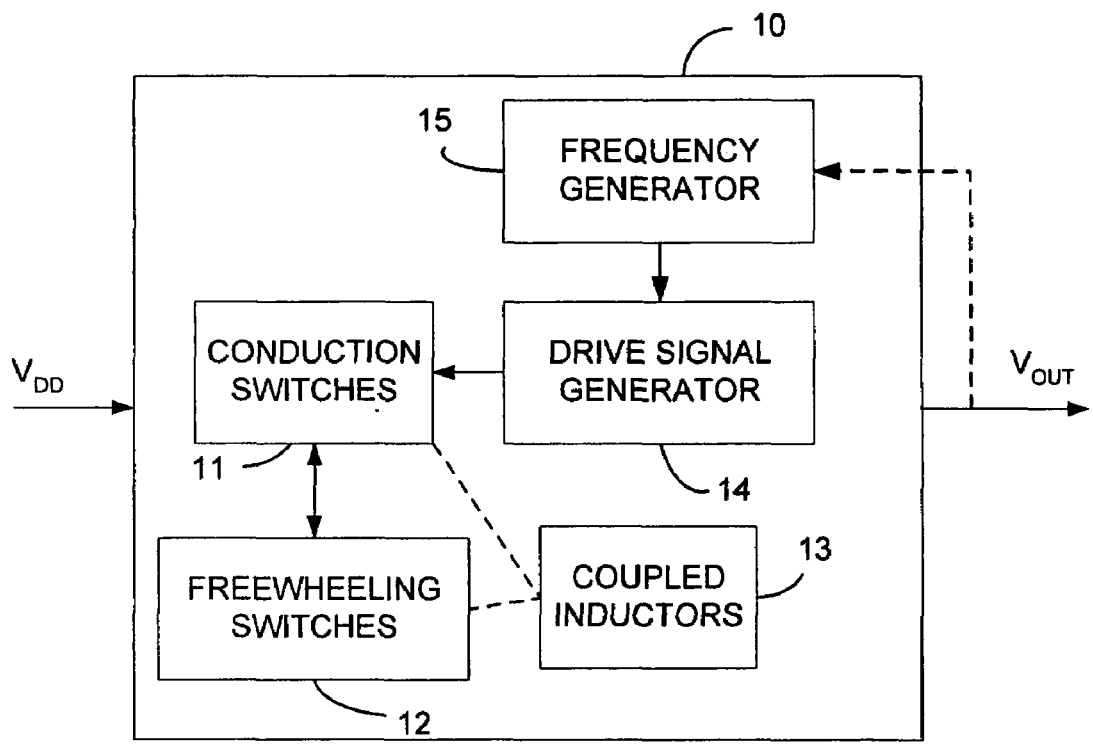
FIG. 1A is a block diagram of an aspect of a coupled inductor regulator.

FIG. 1 shows a block diagram of an aspect of a coupled-inductor regulator 10 for supplying power to one or more devices such as high-speed drivers and other electronic devices. The coupled inductor regulator 10 may operate open-loop to convert an input voltage, $V_{DD}$, to a non-isolated output voltage, $V_{OUT}$. The amplitude of the output voltage is approximately an integer multiple or divisor of the input voltage and may be determined by the configuration of the coupled-inductor regulator 10 and the quantity of coupled inductors in the coupled-inductor regulator 10. For example in a buck configuration having two coupled inductors, the coupled-inductor regulator 10 may generate an output voltage that is approximately one-half of the input voltage.

The coupled-inductor regulator 10 may include conduction switches 11, freewheeling switches 12, and two or more coupled inductors 13 arranged in a buck or boost configuration. A drive signal generator 14 may generate drive signals to control the conduction switches 11. The drive signals are controlled to generate a total conduction time approaching 100%, negating a small amount of deadtime to reduce cross-conduction between the conduction switches 11 and the free-wheeling switches 12.

A frequency generator 15 may generate a clock signal having an operating frequency. The drive signals may be synchronized to operate at the operating frequency. In one aspect, the operating frequency may be fixed to a predetermined frequency. In another aspect, the operating frequency may be controlled in response to changes in load conditions such as output current and output voltage. For example, when a change in the output current, such as an increase in load current, is sensed, the operating frequency may be increased to increase the transient response of the output. Once the coupled inductor regulator 10 has responded to the change in load condition and has reached steady-state operating conditions again, the operating frequency may be decreased to reduce power losses in the coupled inductor regulator 10.

The coupled inductors 13 may be tightly coupled together preferably having a coefficient of coupling, K, of approximately one, where unity is the ideal value. Preferably the inductors 13 are wound together on a common magnetic core to form an inductor assembly that provides the maximum value of coefficient of coupling. The coefficient of coupling is approximately one being at least 0.9 and preferably greater than 0.99. The polarity for each of the windings for the coupled inductors 13 are selected so that DC currents flowing through the coupled inductors 13 approximately cancel, leading to approximately zero DC current flowing through the magnetic core of the inductor assembly. Since there is virtually no DC current flowing through the inductor assembly, a smaller core size may be used for the coupled inductors resulting in a smaller size (volume) and lower cost for the inductor assembly. In addition, high permeability core materials may be used for the magnetic core such as ferrites having shapes such as bead and toroid. Lower permeability materials may also be used such as MPP cores, ferrite PQ cores, and other split core shapes.

In addition to the steady-state advantages obtained by maximizing the coefficient of coupling between the coupled inductors, the transient response of the coupled inductor regulator 10 may also be improved. During a transient, the high mutual coupling between the coupled inductors may effectively cancel the inductance of the individual inductors as far as the transient load current is concerned.

Figure 1B:
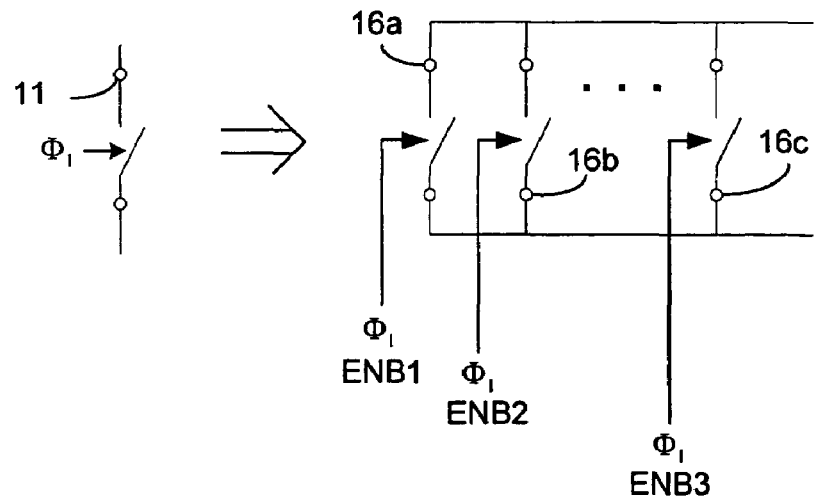
FIG. 1B is a schematic diagram of an aspect of a conduction switch.

FIG. 1B shows an aspect of one of the conduction switches 11 included in the coupled inductor regulator 10. Each of the conduction switches 11 may be comprised of one or more parallel switches, 16a-16c, that are independently controllable. Each of the parallel switches 16a-16c may be controlled by enable signals, ENB1-ENB3, to enable either all or a subset of the parallel switches 16a-16c. The enabled parallel switches 16a-16c may then controlled by the same drive signal, $\Phi_1$.

The conduction switches 11 may also be driven using a multi-level gate voltage to reduce switching losses. For example, the amplitude of the on voltage may be adjusted to differing predetermined levels dependent on factors such as the current flowing through the conduction switch to decrease switching losses in the conduction switch.

FIG. 2A shows an aspect of a 2:1 regulator 20 that may be an embodiment of the coupled inductor regulator 10. The 2:1 regulator 20 may operate open-loop to convert an input voltage, $V_{DD}$, to a non-isolated output voltage that is approximately one-half the amplitude of the input voltage.

FIG. 2B shows a schematic diagram of an aspect of the 2:1 regulator 20. The 2:1 regulator 20 may include two buck converters operating 180 degrees out of phase to generate an output voltage, Vout, from an input voltage. The input voltage may be a high-side voltage, $V_H$, referenced to ground or to some other voltage such as a low-side voltage, $V_L$. Each buck converter may include a conduction switch 22a and 22b, a free-wheeling switch 24a and 24b, and an inductor 26a and 26b. An output capacitor 28 may filter the output voltage for each of the buck converters. The value of the output capacitor 28 may be decreased since there is negligible ripple current. In addition, due to the tight coupling between the output and the input of the 2:1 regulator 20, any capacitance at the input works in concert with the output capacitance 28 to effectively provide parallel capacitance to a load at the output.

The inductors, 26a and 26b, may be tightly coupled together preferably having a coefficient of coupling, K, of approximately one, where unity is the ideal value. Preferably the inductors 26a and 26b are wound together on a common magnetic core to form an inductor assembly 27 that provides a high value of coefficient of coupling between the inductors 26a and 26b. The polarities of the inductor windings are selected so that the DC currents flowing through the inductors 26a and 26b approximately cancel so that approximately zero DC current flows through the magnetic core of the inductor assembly 27. Therefore, a smaller core size with a low permeability material may be used for the inductors 26a and 26b, resulting in a smaller size (volume) and lower cost for the inductor assembly 27. In addition, the transient response of the 2:1 buck regulator 20 is improved due to cancellation of the individual inductances as far as transient load currents are concerned.

Any type of switches may be used for the free-wheeling switches 24a and 25b such as synchronous rectifiers and discrete rectifiers.

Using a two level gate voltage for the conduction switches 22a and 22b is particularly advantageous with the 2:1 buck converter 20 since the output voltage, $V_{DD}/2$, may be used as the intermediate level voltage for driving the conduction switches.

FIG. 2C shows waveforms associated with an aspect of the 2:1 Regulator 20. Each of the conduction switches 22a and 22b are controlled by drive signals that are operated approximately 180 degrees out-of-phase. The first conduction switch 22a may be driven by a signal $\Phi_1$, 30, that is approximately a square-wave. The second conduction switch 22b may be driven a second signal $\overline{\Phi}_1$, 32, that is approximately the inverse of signal $\Phi_1$, 30. A minimal amount of deadtime may be included between $\Phi_1$, and $\overline{\Phi}_1$, to decrease any shoot-through currents that may flow from the conduction switches 22a and 22b through the freewheeling switches 24a and 24b during switching transitions. The amount of deadtime may be minimized to decrease the ripple current and to improve the transfer of energy to the output. When the first conduction switch 22a is conducting, the current, I1, 34 flowing through the output inductor 26a increases at a linear rate. Similarly, when the second conduction switch 22b is conducting, the current, I2, 36 flowing through the output inductor 26b increases at a linear rate. Since the combined conduction time of the conduction switches 22a and 22b approaches 100%, the amplitude of the ripple current flowing to the output capacitor 28 is negligible, leading to a smaller output capacitor 28 for filtering the output.

FIG. 3A shows an aspect of a 1:2 Regulator 50 that may be an embodiment of the coupled inductor regulator 10. The 1:2 regulator 50 may operate open-loop to convert an input voltage, $V_{DD}$, to a non-isolated output voltage that is approximately twice the amplitude of the input voltage.

FIG. 3B shows a schematic diagram of an aspect of the 1:2 regulator 50. The 1:2 regulator 50 may include two boost converters operating 180 degrees out of phase to generate an output voltage, Vout, from an input voltage. The input voltage may be a high-side voltage, $V_H$, referenced to ground or to some other voltage such as a low-side voltage, $V_L$. Each boost converter may include a conduction switch 52a and 52b, a free-wheeling switch 54a and 54b, and an inductor 56a and 56b. An output capacitor 58 may filter the output voltage for each of the boost converters. Similar to the 2:1 regulator 20, the value of the output capacitor 58 may be decreased since there is negligible ripple current, and due to the tight coupling between the output and the input of the 1:2 regulator 50, any capacitance at the input works in concert with the output capacitance 58 to effectively provide parallel capacitance to a load at the output.

Each of the conduction switches 52a and 52b are controlled by drive signals that are operated approximately 180 degrees out-of-phase. The first conduction switch 52a may be driven by a signal $\Phi_1$ that is approximately a square-wave. The second conduction switch 52b may be driven a second signal $\overline{\Phi}_1$ that is approximately the inverse of signal $\Phi_1$. A minimal amount of deadtime may be included between $\Phi_1$ and $\overline{\Phi}_1$ to decrease any shoot-through currents that may flow from the conduction switches 52a and 52b through the free-wheeling switches 54a and 54b during switching transitions. The amount of deadtime may be minimized to decrease the ripple current and to improve the transfer of energy to the output. Since the combined conduction time of the conduction switches 52a and 52b approaches 100%, the amplitude of the ripple current flowing to the output capacitor 58 is negligible, leading to a smaller output capacitor 58 for filtering the output.

The inductors, 56a and 56b, for each of the boost converters may be tightly coupled together preferably having a coefficient of coupling, K, of approximately one. The inductors 56a and 56b may be wound together on a single magnetic core to form an inductor assembly 57 that provides a high value of coefficient of coupling. The benefits of having a high coefficient of coupling are similar to those of the 2:1 regulator 20 and the coupled inductor regulator 10.

Any type of switches may be used for the free-wheeling switches 54a and 55b such as synchronous rectifiers and discrete rectifiers.

Figure 4A:
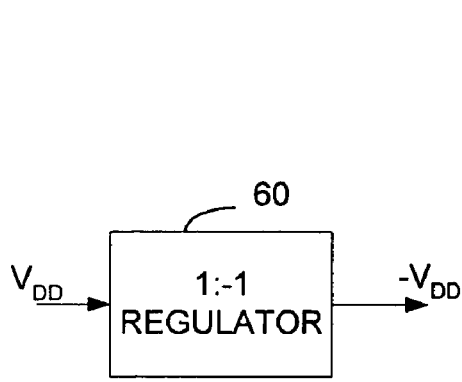
FIG. 4A is a block diagram of an aspect of a 2:−1 buck regulator.

FIG. 4A shows an aspect of a 1:−1 regulator 60 that may be an embodiment of the coupled inductor regulator 10. The 1:−1 regulator 60 may operate open-loop to convert an input voltage, $V_{DD}$, to a non-isolated output voltage that is approximately the negative of the input voltage.

Figure 4B:
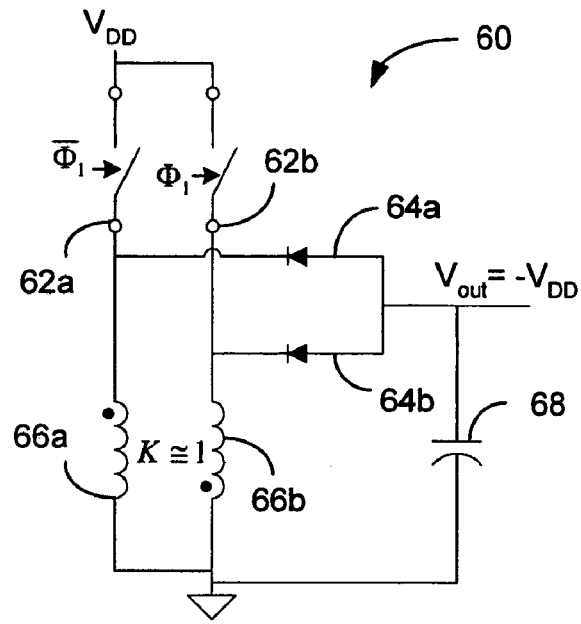
FIG. 4B is a circuit diagram of an aspect of a 2:−11 buck regulator.

FIG. 4B shows a schematic of an aspect of the 1:−1 regulator 60. The 1:−1 regulator 60 is similar to the 2:1 regulator 20 in function with corresponding elements numbered in the range 60-68, except that the 1:−1 regulator 60 may include two flyback regulators operating at approximately 50% duty cycle to generate an output that is the negative of the input voltage.

Figure 5:
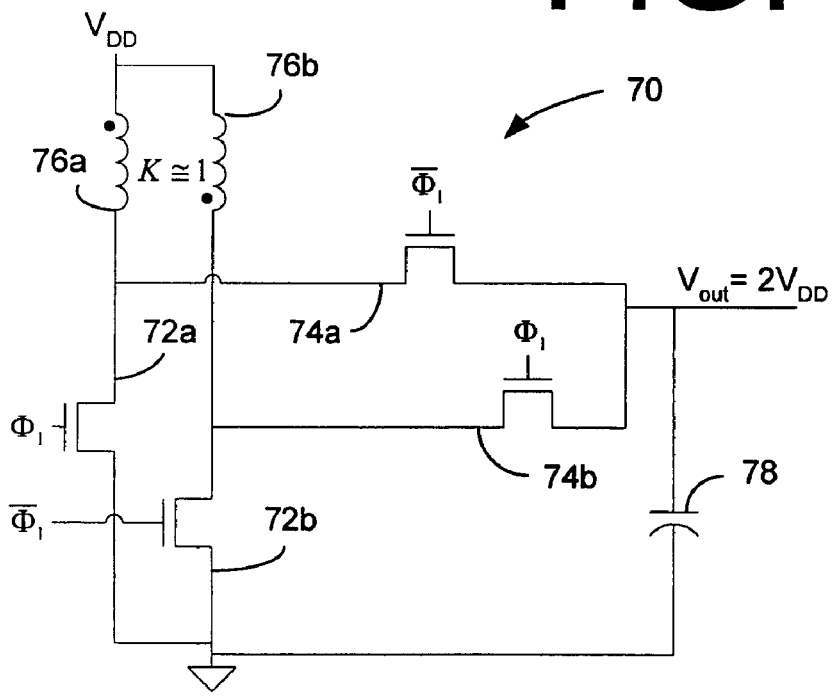
FIG. 5 is a circuit diagram of an aspect of a 1:2 boost regulator having synchronous rectifiers.

FIG. 5 shows an aspect of a coupled inductor regulator 70 that is similar to 1:2 regulator 50 in function with corresponding elements numbered in the range 70-78, except that the coupled inductor regulator 70 includes synchronous rectifiers 74a and 74b to rectify the output signals from the conduction switches 72a and 72b. The synchronous rectifiers 74a and 74b may advantageously reduce losses associated with rectifying the output signals, thereby increasing the energy efficiency of the coupled inductor regulator 70. Although the synchronous rectifiers are illustrated as included in the boost configuration of the coupled inductor regulator, the synchronous rectifiers may be used as the freewheeling rectifiers in any embodiment of the coupled inductor regulator 10.

Figure 6A:
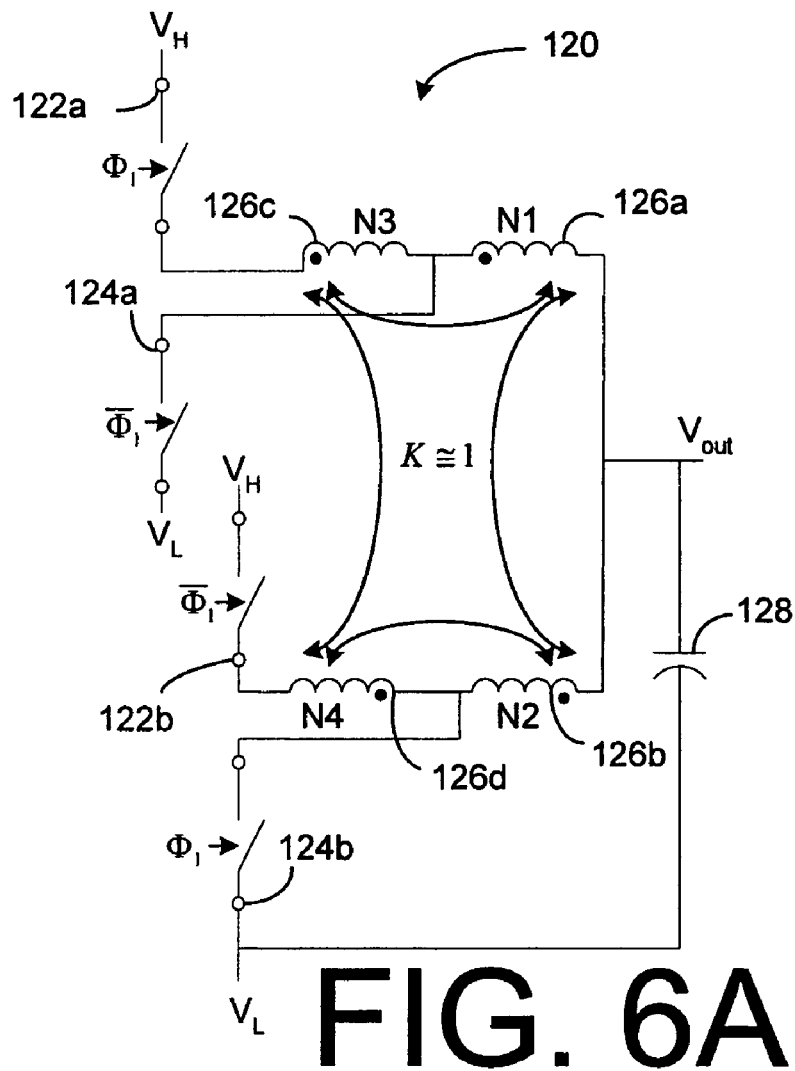
FIG. 6A is a schematic of an aspect of a buck configuration coupled inductor regulator having four coupled inductors.

FIG. 6A shows another aspect of a coupled inductor regulator 120 for converting an input voltage to an output voltage, Vout. The coupled inductor regulator 120 is similar to the 2:1 regulator 20 in function with corresponding elements numbered in the range 120-128, except that the coupled inductor regulator 120 includes four coupled inductors 126a-126d having a coefficient of coupling approaching 1. Each of the coupled inductors 126a-126d may be wound with a predetermined number of turns, N1-N4 so that each of the coupled inductors may have an individually controllable number of turns. The ratio of the turns of each coupled inductor to the other coupled inductors may be varied to control the amplitude of the output voltage, Vout. For example, in one aspect the turns may be set so that N1=N2=N3=N4, in which case the amplitude of the output voltage will be approximately equal to one-fourth of the input voltage. In another aspect the turns may be set so that N1=N2, N3=N4, and N1=2*N3, in which case the amplitude of the output voltage will be approximately equal to one third of the input voltage.

Figure 6B:
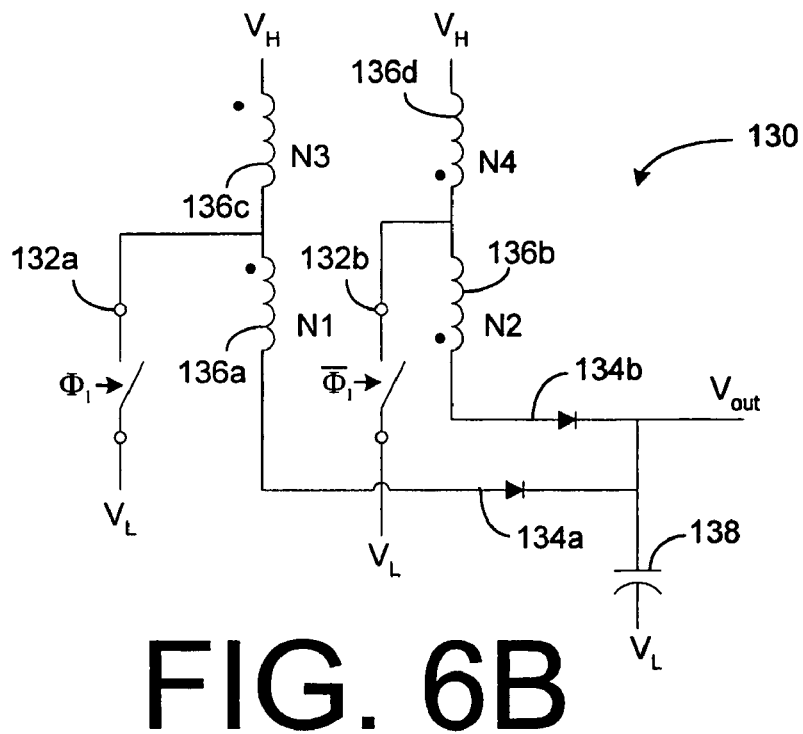
FIG. 6B is a schematic of an aspect of a boost configuration coupled inductor regulator having four coupled inductors.

FIG. 6B shows another aspect of a coupled inductor regulator 130 for converting an input voltage to an output voltage, Vout. The coupled inductor regulator 130 is similar to the 1:2 regulator 50 in function with corresponding elements numbered in the range 130-138, except that the coupled inductor regulator 130 includes four coupled inductors 136a-136d having a coefficient of coupling approaching 1. Each of the coupled inductors 136a-136d may be wound with a predetermined number of turns, N1-N4 so that each of the coupled inductors may have an individually controllable number of turns. The ratio of the turns of each coupled inductor to the other coupled inductors may be varied to control the amplitude of the output voltage, Vout.

Figure 6C:
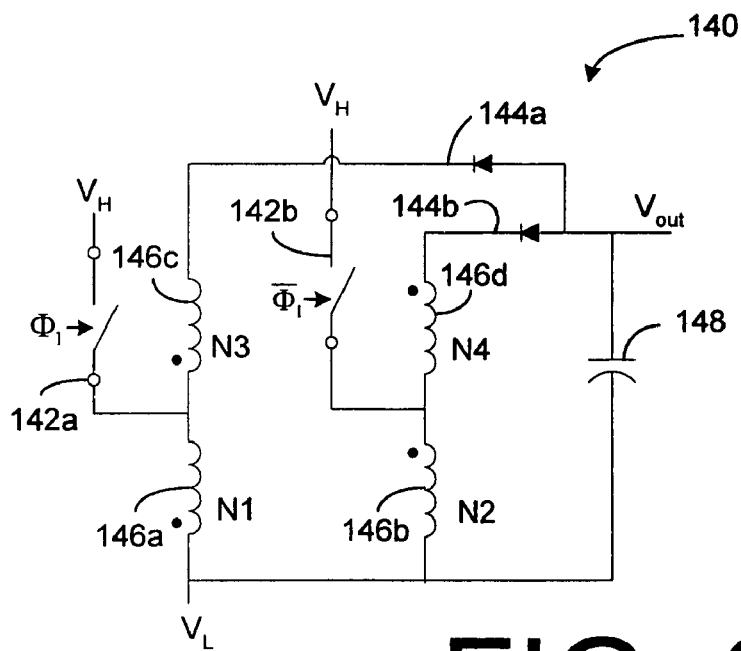
FIG. 6C is a schematic of an aspect of a flyback configuration coupled inductor regulator having four coupled inductors.

FIG. 6C shows another aspect of a coupled inductor regulator 140 for converting an input voltage to an output voltage, Vout. The coupled inductor regulator 140 is similar to the 1:−1 regulator 60 in function with corresponding elements numbered in the range 140-148, except that the coupled inductor regulator 140 includes four coupled inductors 146a-146d having a coefficient of coupling approaching 1. Each of the coupled inductors 146a-146d may be wound with a predetermined number of turns, N1-N4 so that each of the coupled inductors may have an individually controllable number of turns. The ratio of the turns of each coupled inductor to the other coupled inductors may be varied to control the amplitude of the output voltage, Vout.

Figure 16A:
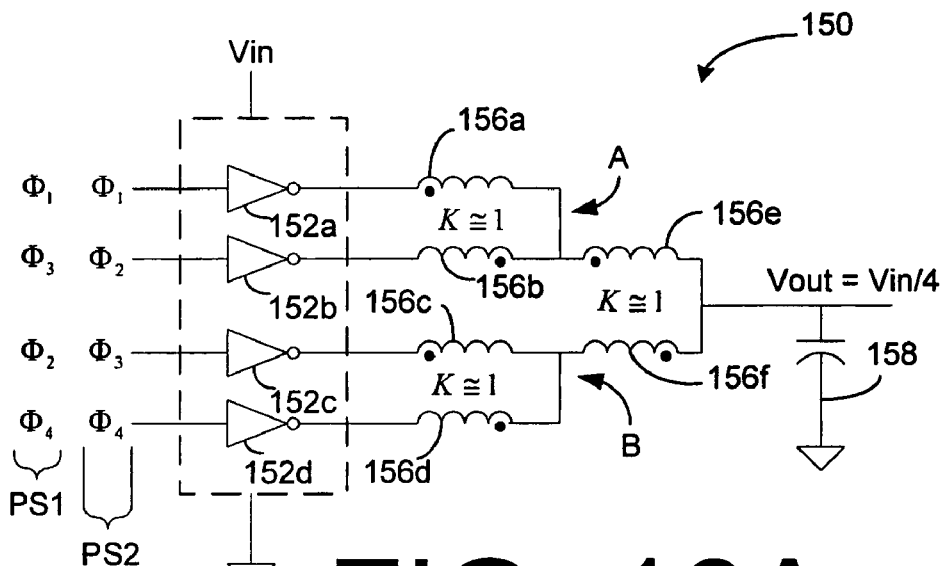
FIG. 16A is a schematic of an aspect of a buck configuration coupled inductor regulator for generating an output voltage that is approximately one-fourth the amplitude of the input voltage.

FIG. 16A shows an aspect of a 4:1 regulator 150 for generating an output voltage, Vout, from an input voltage, Vin. The 4:1 regulator 150 may operate open-loop to generate Vout as a non-isolated voltage that is approximately one-fourth the amplitude of Vin. The 4:1 regulator 150 may include four drivers 152a-152d to buffer phase signals, φ1-φ4, corresponding to each of the drivers 152a-152d. The drivers 152a-152d may be in communication with six coupled inductors 156a-156f arranged in a lattice network.

Pairs of the coupled inductors 156a-156b, 156c-156d, and 156e-156f may each be tightly coupled together preferably having a coefficient of coupling, K, of approximately one. Preferably each pairs of inductor 156a-156b, 156c-156d, and 156e-156f is wound together on a corresponding common magnetic core to form inductor assemblies that may provide a high value of coefficient of coupling between the inductors 156a-156b, 156c-156d, and 156e-156f. The polarities of the inductor windings are selected so that the DC currents flowing through each pair of inductors 156a-156b, 156c-156d, and 156e-156f approximately cancel so that approximately zero DC current flows through the magnetic core of the corresponding inductor assembly. In another aspect, all of the inductors 156a-156f may be wound on a single magnetic core.

The drivers 152a-152d may advantageously be included on a single semiconductor die to reduce cost, or decrease the volume of the 4:1 regulator. The phase signals each may have an on-state and an off-state, and a duty cycle of approximately 25%. The phase signals may be arranged in a timing sequence such as in one aspect, an alternating timing sequence, PS1, and in another aspect the phase signals may be arranged in a sequential timing sequence, PS2. In the alternating timing sequence PS1, phase signals φ1-φ3-φ2-φ4 respectively are applied to the drivers 152a-152b-152c-152d (see FIG. 16B). In the sequential timing sequence PS2, phase signals φ1 1-φ2-φ3-φ4 respectively are applied to the drivers 152a-152b-152c-152d. The coupled inductors 156a-156f preferably have a coefficient of coupling approaching 1 and may be wound with approximately an equal number of turns on the same magnetic core structure. An output capacitor 158 may filter the output voltage to reduce noise and ripple voltage. Similar to the 2:1 regulator 20 the value of the output capacitor 158 may be decreased since there is negligible ripple current, and the capacitance at the input works in concert with the output capacitance.

Figure 16B:
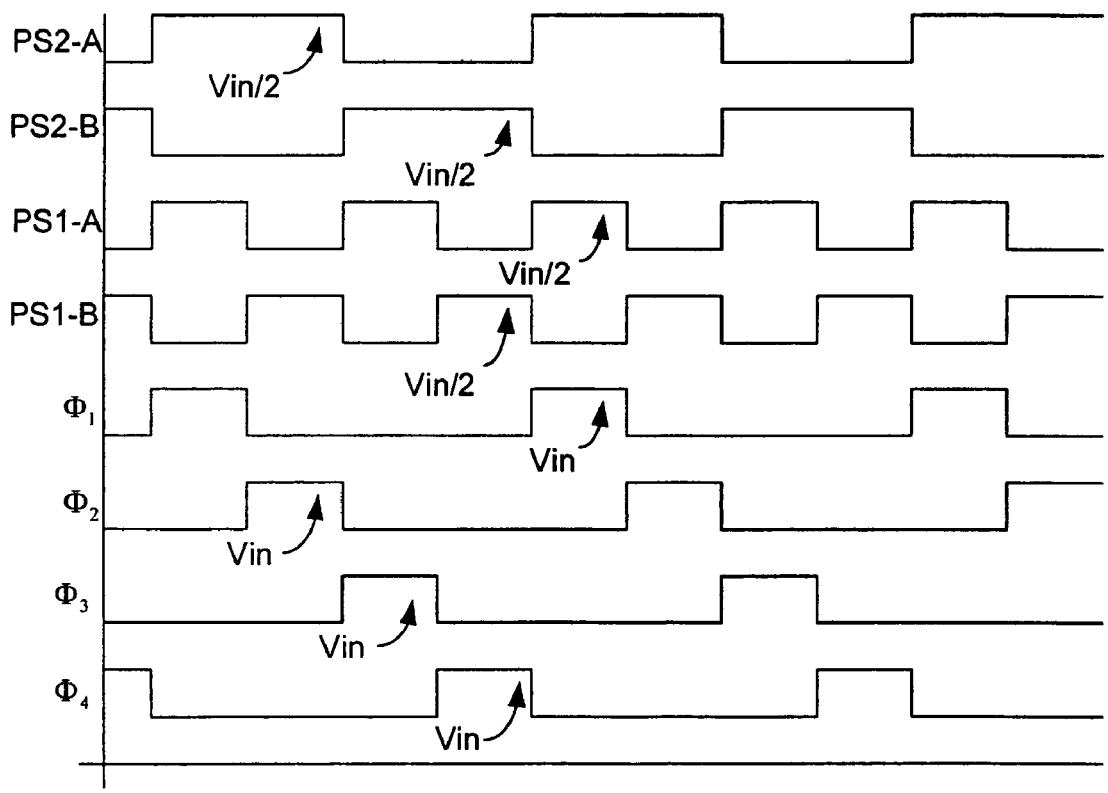
FIG. 16B is a timing diagram of signals corresponding to an aspect of a buck configuration coupled inductor regulator.

FIG. 16B shows signals and waveforms associated with an aspect of the 4:1 regulator 150. The phase signals, φ1-φ4, show the timing relationship between each of the phases, φ1-φ4. Each of the phases, φ1-φ4, may have a duty cycle of approximately 25% and an amplitude of approximately Vin. Signal PS2-A shows the waveform at node A of FIG. 16A when the PS2 phase sequence of the phase signals, φ1-φ4 is applied to the drivers 152a-152d. Signal PS2-B shows the waveform at node B of FIG. 16A when the PS2 phase sequence of the phase signals, φ1-φ4 is applied to the drivers 152a-152d. The amplitude of signals PS2-A and PS2-B may be approximately Vin/2.

Signal PS1-A shows the waveform at node A of FIG. 16A when the PS1 phase sequence of the phase signals, φ1-φ4 is applied to the drivers 152a-152d. Signal PS1-B shows the waveform at node B of FIG. 16A when the PS1 phase sequence of the phase signals, φ1-φ4 is applied to the drivers 152a-152d. The amplitude of signals PS1-A and PS1-B may be approximately Vin/2. The signal frequency of signals PS1-A and PS1-B is approximately twice the frequency of signals PS2-A and PS2-B leading to potentially smaller inductance values when the PS1 timing sequence is used versus the PS2 timing sequence.

Figure 16C:
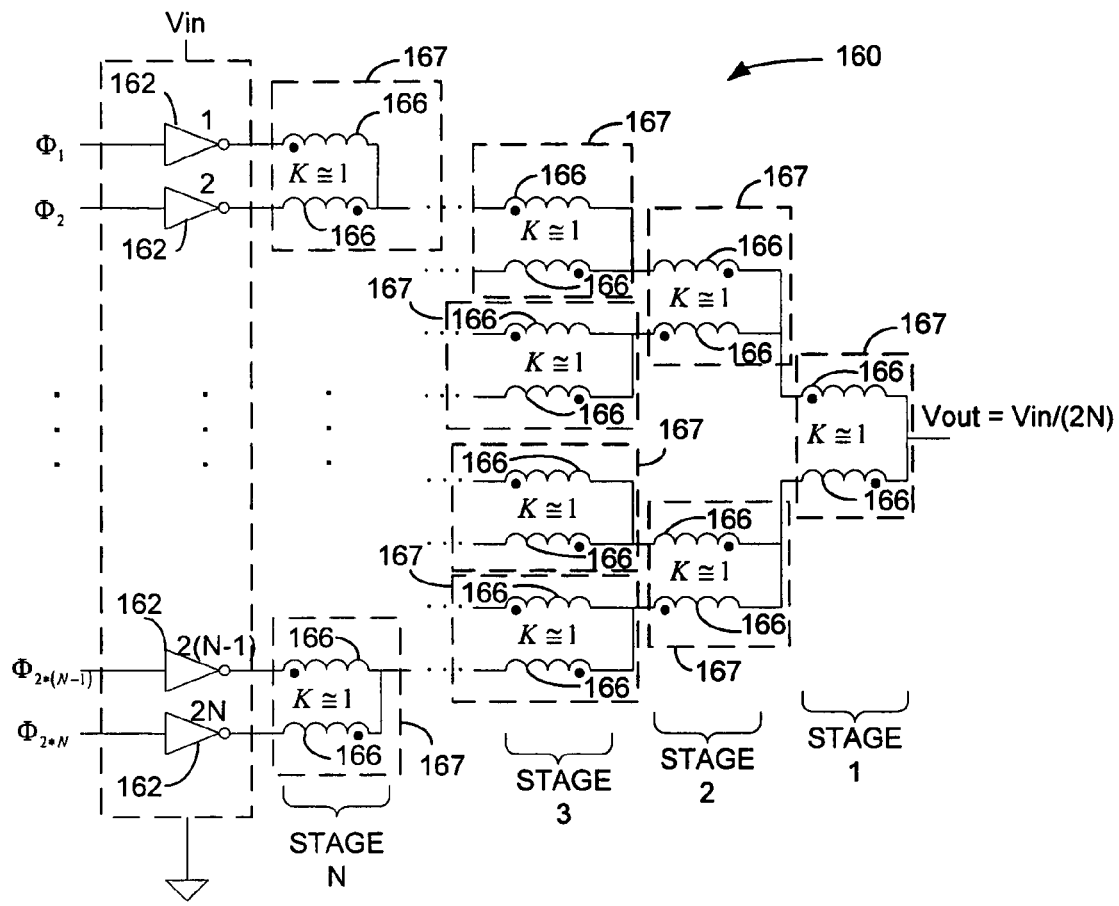
FIG. 16C is a schematic of an aspect of another buck configuration coupled inductor regulator having coupled inductors.

FIG. 16C shows an aspect of a coupled inductor regulator 160 for generating an output voltage, Vout, from an input voltage, Vin. The coupled inductor regulator 160 is in a buck configuration and may include multiple coupled inductors 166 arranged in a lattice network having any quantity of stages ranging from 1 to N. The coupled inductor regulator 160 may operate open-loop to generate Vout as a non-isolated voltage that is approximately equal to Vin/(2N). The coupled inductor regulator 160 may include drivers 162 to buffer phase signals, $\phi_1$-$\phi_{2N}$, corresponding to each of the drivers 162. Each of the phase signals, $\phi_1$-$\phi_{2N}$, may have a duty cycle of approximately (100/2N)% and an amplitude of Vin. The phase signals may be arranged in any timing sequence such as PS1 and PS2 as shown with the 4:1 regulator 150.

Pairs of the coupled inductors 167 within each stage may be tightly coupled together preferably having a coefficient of coupling, K, of approximately one. Preferably each pair of inductors 167 is wound together on a corresponding common magnetic core to form inductor assemblies that may provide a high value of coefficient of coupling between the inductors 166. For example, stage two may have two inductor assemblies and stage three may have four inductor assemblies. The polarities of the inductor windings are selected so that the DC currents flowing through each pair of inductors 167 approximately cancel so that approximately zero DC current flows through the magnetic core of the corresponding inductor assembly. In another aspect, all of the inductors 166 may be wound on a single magnetic core.

FIG. 7A shows an aspect of a regulator system 200 for generating a regulated output voltage, Vout, from an input voltage, Vin. The regulator system 200 includes a low dropout regulator, LDO, 202 in series with a coupled inductor regulator 204. The LDO 202 may control the LDO output, Vx, as a function of one or more feedback signals. In one aspect, a feedback signal 206 from the output of the coupled inductor regulator 204 may communicate a sample of Vout to the LDO 202 to be compared to a reference voltage. The LDO 202 may regulate the LDO voltage, Vx, as a function of comparing Vout to the reference voltage. The coupled inductor regulator 204 may generate Vout as a function of a fixed ratio of Vx. For example, if a 2:1 regulator is used for the coupled inductor regulator 204, then Vout is approximately equal to one-half the amplitude of Vx. In another example, if a 1:2 regulator is used for the coupled inductor regulator 204, then Vout is approximately equal to twice the amplitude of Vx. In another aspect, multiple feedback signals may be used for multi-loop control of the regulator system 200. Any multi-loop control techniques may be employed such as weighted feedback signals, selecting one feedback signal from amongst the multiple feedback signals, and varying the response time of each feedback loop. For example, the inner feedback loop from Vx to the LDO 202 may be set slower than an outer loop from Vout to the LDO 202. Any type of linear regulator may be used for the low drop out regulator. In one aspect the LDO 202 and the coupled inductor regulator 204 may be fabricated on a single integrated circuit 201 with separate inductor assemblies for the output inductors and coupled inductors. In another aspect, the order of the coupled inductor regulator 204 and the LDO 202 may be reversed so that the coupled inductor regulator 204 generates the intermediate voltage, Vx, from the input voltage, Vin, and the LDO 202 generates the output voltage, Vout. The LDO 202 may receive a feedback signal from Vout and a feedforward signal from the intermediate voltage.

FIG. 7B shows an aspect of a preferred embodiment of a regulator system 210 in which a combination of a reference amplifier 214 and Field Effect Transistor 216 form an LDO having an LDO output, Vx. A 2:1 regulator 212 generates an output voltage, Vout, from Vx, where Vout is approximately equal to one-half of the amplitude of Vx. An output capacitor 214 may filter the output from the 2:1 regulator 212. The regulator system 210 advantageously only requires the LDO to supply a current, Ix, that is one-half the amplitude of the output current, Iout, thereby lowering the cost of the FET 204 and heat sink requirements for the LDO. A capacitor 218 may also be included at the output of the FET 216 to possibly improve the stability of the LDO. In one exemplary regulator system 210, Vin may be 3.3V and Vout may be in the range of 1.2V to 1.5V. In another exemplary regulator system 210, Vin may 2.5V and Vout may be in the range of 0.8V to 1.2V.

FIG. 8 shows an aspect of a two stage regulator system 300 for generating an output voltage, Vout, that is approximately equal to one-fourth of the amplitude of the input voltage, Vin. A first stage 2:1 regulator 302 is connected in series with a second stage 2:1 regulator 304. The first stage 2:1 regulator 302 may operate at twice the voltage, but half of the current of the second stage 2:1 regulator 304. Since the two stages 302 and 304 operate at different voltages, the semiconductor processes used for each of the stages 302 and 304 may be optimized for the operating voltage. For example, the first stage 2:1 regulator 302 may be made using a 0.5 um equivalent logic transistor process, while the second stage 2:1 regulator 304 may be made using a 0.25 um equivalent logic transistor process. Selecting the process to be used for each regulator stage based on the voltage of the stage may be applied to any of the embodiments of the coupled inductor regulator as well as any configuration of coupled inductor regulators such as a combination of series, parallel, and tapped coupled inductor regulators. By optimizing the process that is used for each of the coupled inductor regulators, the die size may be reduced leading to a substantial decrease in cost.

FIG. 9A shows an aspect of a very low voltage high current regulator 320 (VLVHC regulator) for generating a low voltage output. The VLVHC regulator 320 may include a buck converter 322 followed by a 2:1 regulator 324. In one aspect the buck converter 322 and the 2:1 regulator 324 may be fabricated on a single integrated circuit 201 with separate inductor assemblies for the output inductors and coupled inductors. The buck converter 322 may be any type of buck converter such as a traditional buck converter having one or more output phases. One or more feedback signals for controlling the output of the buck converter 322 may be communicated to the buck converter 322 from various points in the VLVHC regulator 320 such as the output of the 2:1 regulator 324 and the output of the buck converter 322. Since the output current of the buck converter 322 is half the amplitude that it would be if a single buck converter converted Vin directly to Vout, the output devices of the buck converter 322 may advantageously be reduced in size by a factor of at least 2 compared to generating Vout with only a single buck converter. The output devices may include devices such as output capacitors and output inductors. The invention advantageously recognizes that the ripple voltage at the output of the 2:1 regulator 324 will be reduced by a factor of two from the ripple voltage at the output of the buck converter 322, therefore smaller output devices may be used for the buck converter 322. In addition, the volumetric efficiency of capacitors is typically directly related to the voltage rating of a capacitor so that typically the volume of a capacitor decreases by $(V_H/V_L)^2$ as the voltage rating of the capacitor rating increases, where VH is the higher voltage rating and VL is the lower voltage rating.

In addition, the volume of inductors is directly related to the square of the current that flows through an inductor, so that the volume of an inductor decreases as the maximum rated current of the inductor decreases. In one aspect, multiple feedback signals may be used for multi-loop control of the VLVHC regulator 320. Any multi-loop control techniques may be employed such as weighted feedback signals, selecting one feedback signal from amongst the multiple feedback signals, and varying the response time of each feedback loop. For example, the inner feedback loop from the buck converter output to the buck converter 322 may be set slower than an outer loop from Vout to the buck converter 322.

Figure 9B:
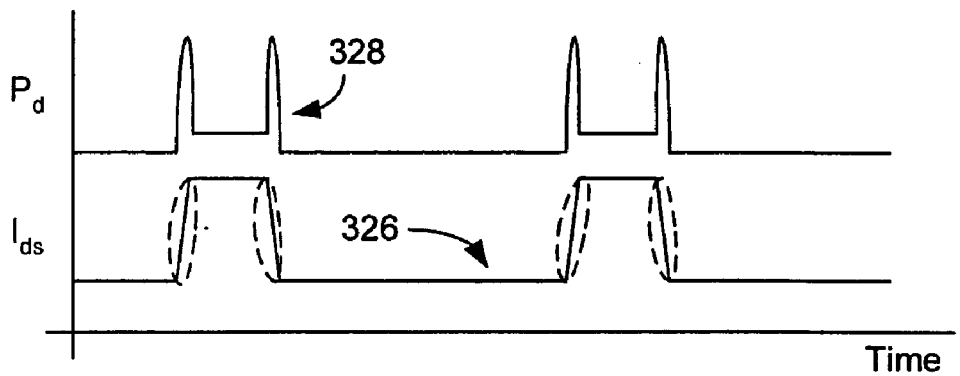
FIG. 9B is a graphical representation of the current and power dissipation in a conduction switch of a buck converter.

In addition, the overall power efficiency of the VLVHC regulator 320 may be lower than if only a non-isolated buck converter were used to convert Vin to Vout. FIG. 9B shows a waveform 326 of current, Ids, flowing through a conduction switch in a non-isolated buck converter that generates Vout from Vin. The duty cycle in the buck converter may be approximately four times lower than the duty cycle in the VLVHC regulator 320. Since the duty cycle is lower, the peak current, Ids, flowing through the conduction switch may be approximately four times greater than the peak current flowing through the conduction switch of the VLVHC regulator 320, leading to switching losses in the buck converter that may be approximately four times greater the switching losses in the buck converter of the VLVHC regulator 320. A waveform 328 of the power dissipation, Pd, in the conduction switches of the non-isolated buck converter shows the high switching losses occurring during switching of the conduction switches.

FIG. 10A shows another aspect of a very low voltage high current regulator 340 (VLVHC regulator) for generating a low voltage output. The VLVHC regulator 340 is similar to the VLVHC regulator 320 in function, except that the VLVHC regulator 340 may include two or more coupled inductor regulators 342 and 344 following an energy source 346. The coupled inductor regulators 342 and 344 are preferably a buck version (2:1 regulator, 3:1 regulator, 4:1 regulator, etc.) of the coupled inductor regulator to take advantage of the decrease in size of the output devices of the energy source 346, however the scope of the invention includes any embodiment of the coupled inductor regulator such as a boost regulator having a 1:2 boost ratio.

Figure 10B:
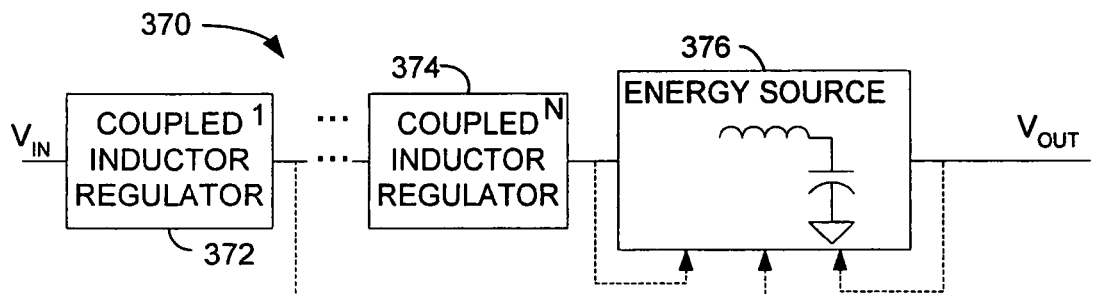
FIG. 10B is a block diagram of another aspect of multiple 2:1 Regulators combined in series with a buck regulator.

FIG. 10B shows another aspect of a very low voltage high current regulator 370 (VLVHC regulator) for generating a low voltage output. The VLVHC regulator 370 is similar to the VLVHC regulator 340 in function, except that the VLVHC regulator 370 may include two or more coupled inductor regulators 372 and 374 preceding an energy source 376. The coupled inductor regulators 372 and 374 may be any configuration such as a buck configuration (2:1 regulator, 3:1 regulator, 4:1 regulator, etc.), a boost configuration (1:2 regulator), and a flyback configuration (1:−1 regulator) of the coupled inductor regulator.

Figure 11:
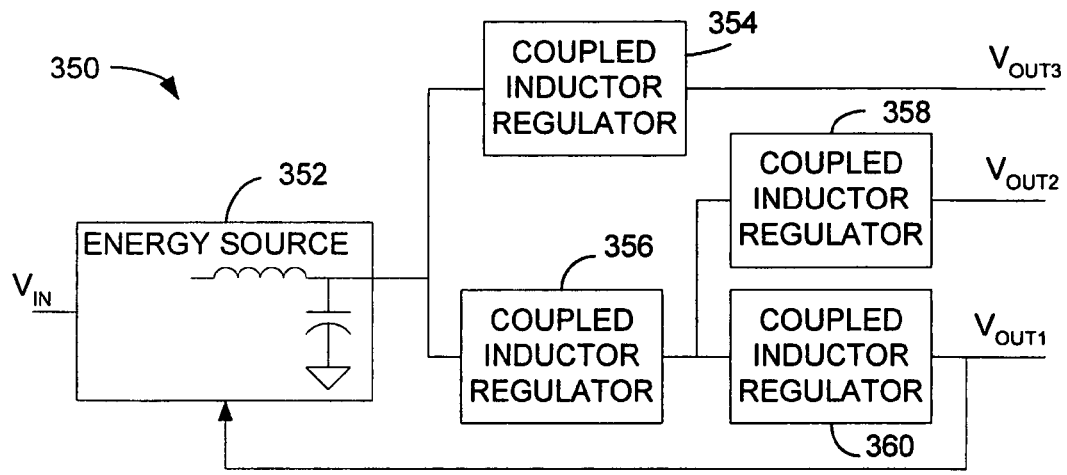
FIG. 11 is a block diagram of an aspect of a regulator system having multiple coupled inductor regulators.

FIG. 11 shows an aspect of a multi-stage regulator system 350 for converting an input voltage, Vin, to several output voltages, Vout1-Vout3. The multi-stage regulator system 350 may include an energy source 352 such as a buck converter connected to two or more coupled inductor regulators 354-360. The multi-stage regulator system 350 may advantageously generate several intermediate voltages such as Vout1-Vout3, while minimizing the cost of the overall implementation by reducing the cost of the output devices of the energy source 352.

Figures 12A, 12B:
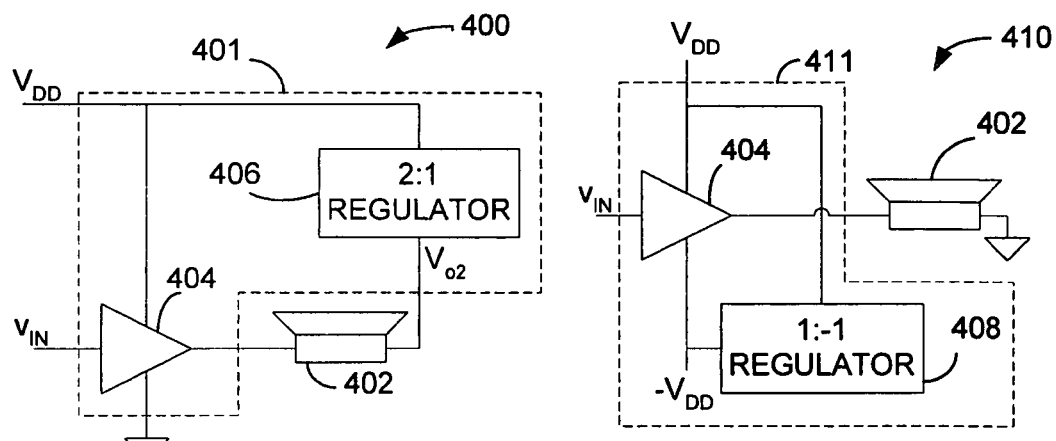
FIG. 12A is a block diagram of an aspect of an amplifier system.
FIG. 12B is a block diagram of another aspect of an amplifier system.

FIGS. 12A and 12B show aspects of single supply amplifier systems 400 and 410 for powering a load such as a speaker 402 from a power amplifier 404. Conventional single supply amplifier systems include a large DC blocking capacitor in series with the load and power amplifier to remove any DC components from the signal from the signal that drives the load. The single supply amplifier system 400 advantageously may use a coupled inductor regulator to generate a second supply voltage, $V_{o2}$, from the first supply voltage $V_{DD}$. The second supply voltage may be used to eliminate DC voltage from appearing across the load 402.

In one aspect, a 2:1 regulator 406 may generate a voltage, $V_{o2}$, that is approximately one-half of the amplitude of $V_{DD}$. The voltage, $V_{o2}$, may be applied to one end of the load 402 to bias the load 402 so that no DC voltage appears across the load 402, thereby eliminating the need for a DC blocking capacitor. In one aspect the 2:1 regulator 406 and the power amplifier 404 may be fabricated on a single integrated circuit 401.

In another aspect, a 1:−2 regulator 408 may generate a voltage, $-V_{DD}$, that is the negative of the high side supply voltage, $V_{DD}$, for the power amplifier 404. The voltage $-V_{DD}$ is used as the low side supply voltage for the power amplifier 404 to convert the power amplifier 404 into a dual power supply amplifier. The power amplifier 404 may then generate generates an output that is approximately centered about zero volts and has approximately no DC component, thereby eliminating the need for a DC blocking capacitor. In one aspect the 1:−1 regulator 408 and the power amplifier 404 may be fabricated on a single integrated circuit 411.

Figure 13:
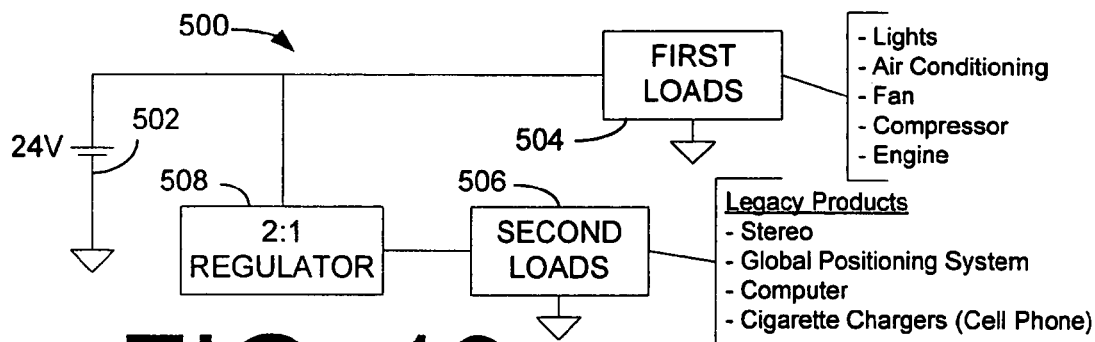
FIG. 13 is a block diagram of an aspect of a vehicle electrical system.

FIG. 13 shows a vehicle electrical system 500 that may be powered by a 24 volt battery 502. The vehicle electrical system 500 may include a mixture of both 24 volt loads 504 and 12 volt loads 506. For example, the basic electrical systems of an automobile such as the engine, compressor, fan, lights, and air conditioning may all be driven from the 24 volt battery 502. Whereas, one or more accessories for the automobile such as a stereo, computer, cigarette charger, and global positioning system may have been designed for a 12 volt automotive system and therefore require a 12 volt supply to provide power. A 2:1 regulator 508 may provide a low cost source of 12 volt power derived from the 24 volt battery 502 so that legacy automotive accessories that require 12 volt power may be employed in the automotive electrical system 500.

Figure 17A:
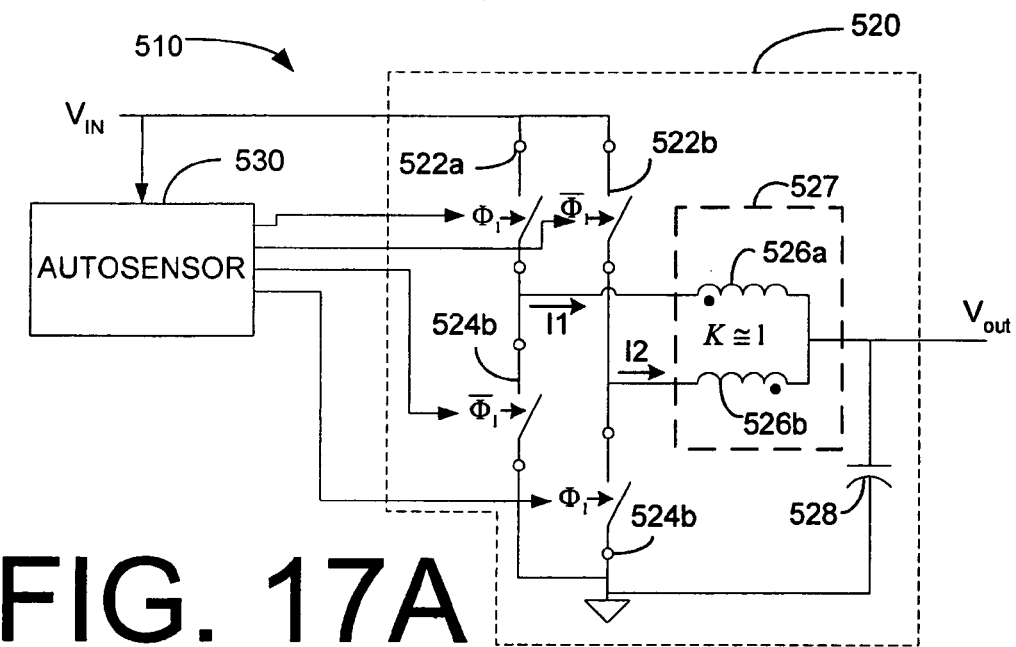
FIG. 17A is a schematic of an aspect of an autosensing coupled inductor regulator having for automatically controlling the amplitude of the output voltage as a function of the input voltage.

FIG. 17A shows an aspect of an autosensing regulator 510 for generating an output voltage, Vout, from an input voltage, Vin. The autosensing regulator 510 is particularly suitable for being used as the 2:1 regulator 508 in the automotive electrical system 500. The autosensing regulator 510 may include an autosensor 530 to sense the input voltage and control a 2:1 regulator 520. The 2:1 regulator may be similar to the 2:1 regulator 20 in function with corresponding elements numbered in the range 520-528. The autosensor 530 may automatically control the 2:1 regulator 520 as a function of the amplitude of the input voltage. For example, when Vin is greater than a predetermined voltage level, the autosensor 530 may set the duty cycle of the conduction switches 522*a* and 522*b* to 50% each so that the 2:1 regulator 520 may generate an output voltage that is approximately one-half the amplitude of Vin, and when Vin is less than the predetermined voltage level, the autosensor 530 may set the conduction switches 522*a* and 522*b* both to the continuous on-state so that Vout is approximately equal to Vin.

Figure 17B:
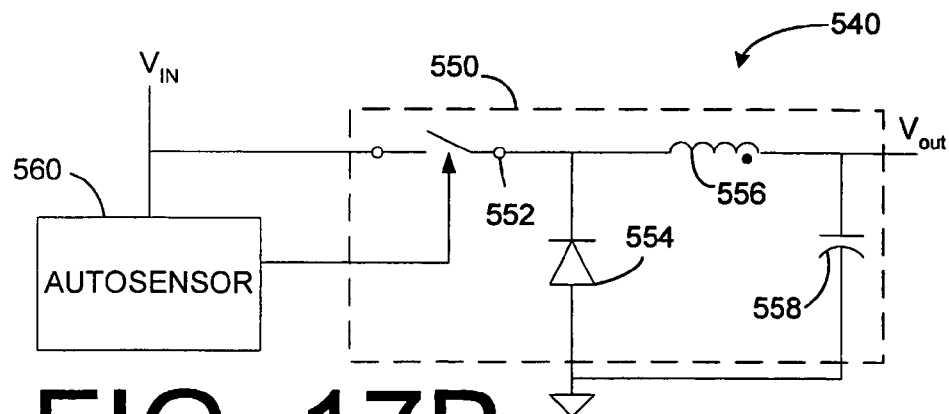
FIG. 17B is a schematic of an aspect of an autosensing buck converter for automatically controlling the amplitude of the output voltage as a function of the input voltage.

FIG. 17B shows another aspect of an autosensing regulator 540 for generating an output voltage, Vout, from an input voltage, Vin. The autosensing regulator 540 may include an autosensor 560 to sense the input voltage and control a conventional buck converter 550 as a function of the amplitude of the input voltage. Any type of buck converter 552 may be employed. The buck converter 550 may include a conduction switch 552, a free-wheeling diode 554, an output inductor 556, and an output capacitor 558. In one aspect, the autosensor may set the conduction switch 552 to the on-state continuously if Vin is less than a predetermined voltage level, and if Vin is greater than the predetermined voltage level the autosensor 560 may enable the conduction switch to be driven by a variable duty cycle signal to maintain a constant output voltage.

Figure 14:
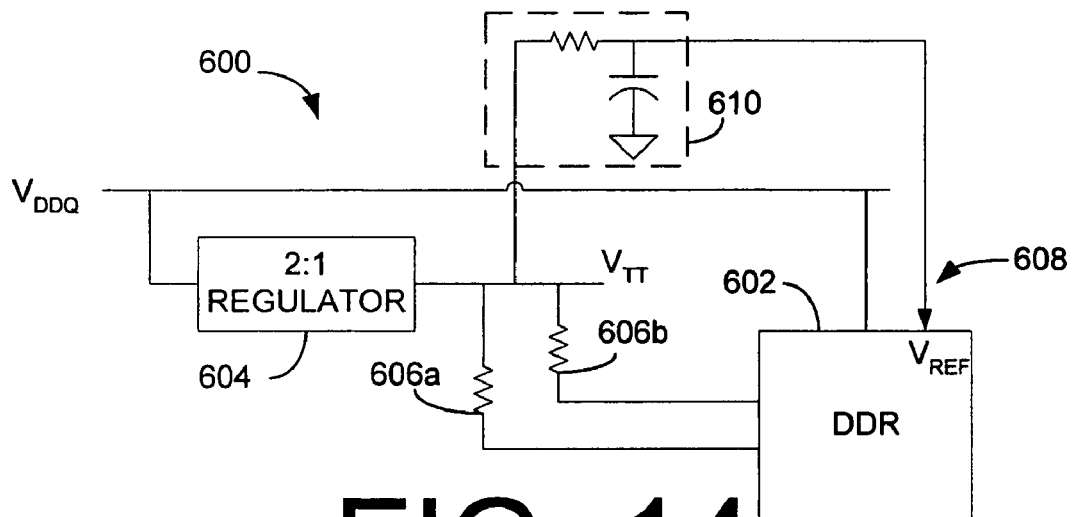
FIG. 14 is a block diagram of an aspect of a power system for high speed drivers.

FIG. 14 shows a driver power system 600 for supplying power to a high speed line driver assembly (DDR) 602. A 2:1 regulator 604 may generate $V_{TT}$ voltage from the $V_{DDQ}$ voltage. The $V_{TT}$ voltage is approximately one-half of the $V_{DDQ}$ voltage. The 2:1 regulator 604 advantageously may use output filter capacitors that are much smaller than conventional regulators may require. The $V_{TT}$ voltage may supply power to termination devices 606*a* and 606*b* and the DDR 602. To compensate for a $V_{TT}$ voltage that is not precisely one-half of the $V_{DDQ}$ voltage, a reference voltage, $V_{REF}$, 608 for the DDR 602 may be derived from the VTT voltage. In addition, a filter 610 may filter the reference voltage 608 to attenuate noise components.

Figures 15A, 15B:
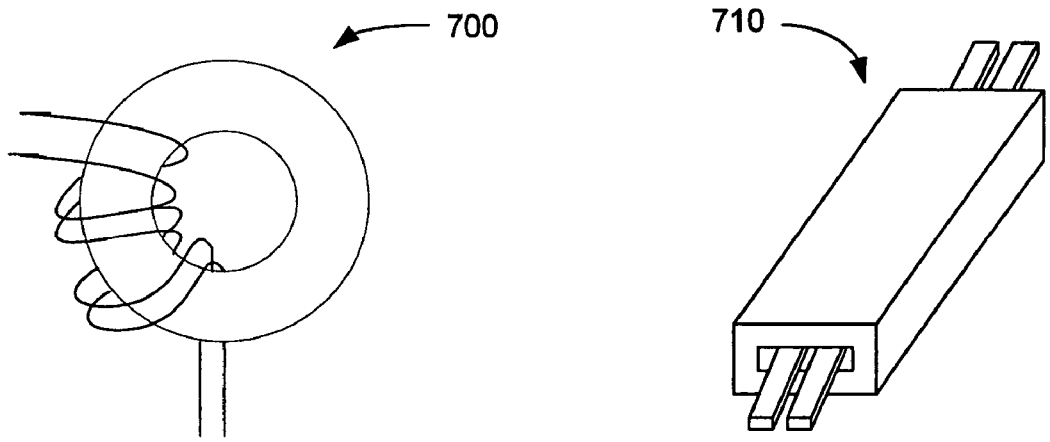
FIG. 15A is a graphical representation of an aspect of a coupled inductor.
FIG. 15B is a graphical representation of an aspect of a coupled inductor.

FIG. 15A shows an aspect of a coupled inductor 700 wound on a torroid. The windings of the coupled inductor 700 are arranged so that DC currents flowing through the windings cancel. By minimizing the combined DC current flowing in the coupled inductor 700, saturation of the torroid is prevented and high permeability materials such as ferrites may used for the torroid to reduce core losses.

FIG. 15B shows another aspect of a coupled inductor 710 wound on a planar assembly. The coupled inductor 710 is similar in function to the coupled inductor 700 such as the windings are arranged so that DC currents flowing through the windings cancel, so that high permeability materials such as ferrites may be used for the core.

A number of embodiments of the invention have been described. Nevertheless, it will be understood that various modifications may be made without departing from the spirit and scope of the invention. Accordingly, other embodiments are within the scope of the following claims.

What is claimed is:

1. A coupled inductor regulator for converting energy from a source of input voltage to an output having an output voltage, comprising:

at least two conduction switches to conduct energy from the source of the input voltage to the output; at least two inductors in communication with the at least two conduction switches, the at least two inductors wound together on a common core and each inductor having a polarity such that DC currents in the at least two inductors cancel each other, the at least two inductors having a coefficient of coupling approximately equal to one;

at least two freewheeling switches in communication with the at least two conduction switches to provide a path for current during non-conduction periods; and a drive signal generator to generate drive signals each having a duty cycle of approximately 50%, the drive signals to control the at least two conduction switches, wherein the output voltage supplies power to a load, and wherein the coupled inductor regulator further comprises a frequency generator to generate a clock signal having an operating frequency, the drive signals synchronous to the clock signal, and the operating frequency controllable in response to changes in the load.

2. The coupled inductor regulator of claim 1, wherein the coefficient of coupling is approximately at least 0.99.

3. The coupled inductor regulator of claim 1, wherein the at least two conduction switches, the at least two inductors, and the at least two freewheeling switches are connected in a buck configuration such that the output voltage is approximately one-half an amplitude of the input voltage.

4. The coupled inductor regulator of claim 3, wherein the buck configuration includes two buck regulators each operating at approximately 50% duty cycle, each of the two buck regulators including:
- a conduction switch in communication with a freewheeling switch and an inductor, the conduction switch to communicate current during a conduction period from the source of input voltage through the inductor to the output, the freewheeling switch to provide a conduction path during one of the non-conduction periods for current flowing through the inductor to the output.

5. A coupled inductor regulator for converting energy from a source of input voltage to an output having an output voltage, comprising:
- at least two conduction switches to conduct energy from the source of input voltage to the output;
- at least two inductors in communication with the at least two conduction switches, the at least two inductors wound together on a common core and each inductor of the at least two inductors having a polarity such that DC currents in the at least two inductors cancel each other, the at least two inductors having a coefficient of coupling approximately equal to one;
- at least two freewheeling switches in communication with the at least two conduction switches to provide a path for current during non-conduction periods; and
- a drive signal generator to generate drive signals each having a duty cycle of approximately 50%, the drive signals to control the at least two conduction switches,
- wherein the at least two conduction switches, the at least two inductors, and the at least two freewheeling switches are connected in a boost configuration such that the output voltage is approximately twice an amplitude of the input voltage, and
- wherein the boost configuration includes two boost regulators each operating at approximately 50% duty cycle, each boost regulator including:
- a conduction switch in communication with a freewheeling switch and an inductor, the conduction switch to communicate current during a conduction period from a high side of the source of input voltage through the inductor to a low side of the source of input voltage, the freewheeling switch to provide a conduction path during one of the non-conduction periods for current flowing from the high side of the source of input voltage through the inductor to the output.

6. A coupled inductor regulator for converting energy from a source of input voltage to an output having an output voltage, comprising:
- at least two conduction switches to conduct energy from the source of input voltage to the output;
- at least two inductors in communication with the at least two conduction switches, the at least two inductors wound to ether on a common core and each inductor of the at least two inductors having a polarity such that DC currents in the at least two inductors cancel each other, the at least two inductors having a coefficient of coupling approximately equal to one;
- at least two freewheeling switches in communication with the at least two conduction switches to provide a path for current during non-conduction periods; and
- a drive signal generator to generate drive signals each having a duty cycle of approximately 50%, the drive signals to control the at least two conduction switches,
- wherein the at least two conduction switches, the at least two inductors, and the at least two freewheeling switches are connected in a 1:−1 configuration such that the output voltage is approximately a negative of the input voltage.

7. The coupled inductor regulator of claim 6, wherein the 1:−1 configuration includes two flyback regulators each operating at approximately 50% duty cycle, each flyback regulator including;
- a conduction switch in communication with a freewheeling switch and an inductor, the conduction switch to communicate current during a conduction period from a high side of the source of input voltage through the inductor to a low side of the source of input voltage, the freewheeling switch to provide a conduction path during one of the non-conduction periods for current flowing from the output through the inductor to the low side of the source of input voltage.

8. The coupled inductor regulator of claim 1, wherein at least one of the at least two conduction switches includes independently controllable parallel switches.

9. The coupled inductor regulator of claim 1,
- wherein the output voltage supplies power to a load, and
- wherein the coupled inductor regulator further comprises a frequency generator to generate a clock signal having an operating frequency, the drive signals synchronous to the clock signal, and the operating frequency controllable in response to changes in the load.

10. The coupled inductor regulator of claim 1, wherein the changes in the load include output current changes and output voltage changes.

11. The coupled inductor regulator of claim 1,
- wherein each of the at least two inductors includes a pair of series inductors, each pair of series inductors having a common node between series inductors, and
- wherein each of the at least two conduction switches is in communication with the common node of a corresponding pair of series inductors.

12. The coupled inductor regulator of claim 11, wherein the at least two conduction switches, the pair of series inductors, and the at least two freewheeling switches are connected in a buck configuration, the buck configuration including two buck regulators each operating at approximately 50% duty cycle, each of the two buck regulators including:
- a conduction switch in communication with a freewheeling switch and the pair of series inductors, the conduction switch to communicate current during a conduction period from the source of input voltage through the pair of series inductors to the output, the freewheeling switch to provide a conduction path during one of the non-conduction periods for current flowing through one of the pair of series inductors to the output.

13. The coupled inductor regulator of claim 11, wherein the at least two conduction switches, the at least two inductors, and the at least two freewheeling switches are connected in a boost configuration including two boost regulators each operating at approximately 50% duty cycle, each boost regulator including:
- a conduction switch in communication with a freewheeling switch and an inductor, the conduction switch to communicate current during a conduction period from a high side of the source of input voltage through the inductor to a low side of the source of input voltage, the freewheeling switch to provide a conduction path during one of the non-conduction periods for current flowing from the high side of the source of input voltage through the inductor to the output.

14. The coupled inductor regulator of claim 11, wherein the at least two conduction switches, the at least two inductors, and the at least two freewheeling switches are connected in a flyback configuration including two flyback regulators each operating at approximately 50% duty cycle, each flyback regulator including:
a conduction switch in communication with a freewheeling switch and an inductor, the conduction switch to communicate current during a conduction period from a high side of the source of input voltage through the inductor to a low side of the source of input voltage, the freewheeling switch to provide a conduction path during one of the non-conduction periods for current flowing from the output through the inductor to the low side of the source of input voltage.

15. A coupled inductor regulator for converting energy from a source of input voltage to an output having an output voltage, comprising:
at least two conduction switches to conduct energy from the source of input voltage to the output;
at least two inductors in communication with the at least two conduction switches, the at least two inductors wound together on a common core and each of the at least two inductors having a polarity such that DC currents in the at least two inductors cancel each other, the at least two inductors having a coefficient of coupling approximately equal to one;
at least two freewheeling switches in communication with the at least two conduction switches to provide a path for current during non-conduction periods; and
a drive signal generator to generate drive signals each having a duty cycle of approximately 50%, the drive signals to control the at least two conduction switches,
wherein each of the at least two inductors includes a pair of series inductors, each pair having a common node between series inductors,
wherein each of the at least two conduction switches is in communication with the common node of a corresponding pair of series inductors, and
wherein each of the at least two inductors has a quantity of turns, and a turns ratio of the turns for each pair of series inductors is selected to set a voltage ratio of the output voltage divided by the input voltage.

16. The coupled inductor regulator of claim 15,
wherein the at least two inductors each have approximately an equal quantity of turns such that the output voltage is approximately equal to one-fourth of the input voltage, and
wherein the at least two conduction switches, the pair of series inductors, and the at least two freewheeling switches are connected in a buck configuration, the buck configuration including two buck regulators each operating at approximately 50% duty cycle, each of the two buck regulators including:
a conduction switch in communication with a freewheeling switch and the pair of series inductors, the conduction switch to communicate current during a conduction period from the source of input voltage through the pair of series inductors to the output, the freewheeling switch to provide a conduction path during one of the non-conduction periods for current flowing through one of the pair of series inductors to the output.

17. The coupled inductor regulator of claim 15,
wherein the pair of series inductors includes a first inductor in communication with one of the at least two conduction switches and a second inductor in communication with the output,
wherein the turns ratio of the first inductor and the second inductor is defined as a quantity of turns of the first inductor divided by a quantity of turns of the second inductor, and
wherein the turns ratio of the pair of series inductors is approximately equal to one-half such that the voltage ratio is approximately one-third.

18. The coupled inductor regulator of claim 1, wherein the at least two freewheeling switches include synchronous rectifiers.

19. The coupled inductor regulator of claim 1, wherein the drive signals include multi-level switching to reduce switching losses.

20. The coupled inductor regulator of claim 1, wherein the coupled inductor regulator is included in a power system, the power system including:
a low dropout regulator having a first output, the first output being the input voltage to the coupled inductor regulator; and
a feedback signal connected from the output voltage of the coupled inductor regulator to the low dropout regulator, the low dropout regulator to regulate the first output in response to the feedback signal.

21. The coupled inductor regulator of claim 1, wherein the common core is made from a high permeability material.

22. The coupled inductor regulator of claim 21, wherein the common core is made from a ferrite.

23. A coupled inductor regulator for converting energy from a source of input voltage to an output having an output voltage, comprising:
at least two means for conduction switching to controllably conduct energy from the source of input voltage to the output;
at least two inductors in communication with the at least two means for conduction switching, the at least two inductors wound together on a common core and each of the at least two inductors having a polarity such that DC currents in the at least two inductors cancel each other, the at least two inductors having a coefficient of coupling approximately equal to one;
at least two means for freewheeling switching in communication with the at least two means for conduction switching means to provide a path for current during non-conduction periods; and
means for generating drive signals, the drive signals each having a duty cycle of approximately 50%, and the drive signals to control the at least two means for conduction switching,
wherein the output voltage supplies power to a load, and
wherein the coupled inductor regulator further comprises a frequency generator to generate a clock signal having an operating frequency, the drive signals synchronous to the clock signal, and the operating frequency controllable in response to changes in the load.

24. The coupled inductor regulator of claim 23, wherein the coefficient of coupling is approximately at least 0.99.

25. The coupled inductor regulator of claim 23, wherein the at least two means for conduction switching, the at least two inductors, and the at least two means for freewheeling switching are connected in a buck configuration such that the output voltage is approximately one-half an amplitude of the input voltage.

26. The coupled inductor regulator of claim 25, wherein the buck configuration includes two buck regulators each operating at approximately 50% duty cycle, each of the two buck regulators including:
   a means for conduction switching in communication with a means for freewheeling switching and an inductor, the means for conduction switching to communicate current during a conduction period from the source of input voltage through the inductor to the output, the means for freewheeling switching to provide a conduction path during one of the non-conduction periods for current flowing through the inductor to the output.

27. The coupled inductor regulator of claim 23, wherein the at least two means for conduction switching, the at least two inductors, and the at least two means for freewheeling switching are connected in a boost configuration such that the output voltage is approximately twice an amplitude of the input voltage.

28. The coupled inductor regulator of claim 27, wherein the boost configuration includes two boost regulators each operating at approximately 50% duty cycle, each boost regulator including:
   a means for conduction switching in communication with a means for freewheeling switching and an inductor, the means for conduction switching to communicate current during a conduction period from a high side of the source of input voltage through the inductor to a low side of the source of input voltage, the means for freewheeling switching to provide a conduction path during one of the non-conduction periods for current flowing from the high side of the source of input voltage through the inductor to the output.

29. A coupled inductor regulator for converting energy from a source of input voltage to an output having an output voltage, comprising:
   at least two means for conduction switching to controllably conduct energy from the source of input voltage to the output;
   at least two inductors in communication with the at least two means for conduction switching, the at least two inductors wound together on a common core and each of the at least two inductors having a polarity such that DC currents in the at least two inductors cancel each other, the at least two inductors having a coefficient of coupling approximately equal to one;
   at least two means for freewheeling switching in communication with the at least two means for conduction switching to provide a path for current during non-conduction periods; and
   means for generating drive signals, the drive signals each having a duty cycle of approximately 50%, and the drive signals to control the at least two means for conduction switching,
   wherein the at least two means for conduction switching, the at least two inductors, and the at least two means for freewheeling switching are connected in a 1:−1 configuration such that the output voltage is approximately a negative of the input voltage.

30. The coupled inductor regulator of claim 29, wherein the 1:−1 configuration includes two flyback regulators each operating at approximately 50% duty cycle, each flyback regulator including:
   a means for conduction switching in communication with a means for freewheeling switching and an inductor, the means for conduction switching to communicate current during a conduction period from a high side of the source of input voltage through the inductor to a low side of the source of input voltage, the means for freewheeling switching to provide a conduction path during one of the non-conduction periods for current flowing from the output through the inductor to the low side of the source of input voltage.

31. The coupled inductor regulator of claim 23, wherein at least one of the at least two means for conduction switching includes independently controllable parallel switches.

32. The coupled inductor regulator of claim 23,
   wherein the output voltage supplies power to a load, and
   wherein the coupled inductor regulator further comprises means for frequency generating to generate a clock signal having an operating frequency, the drive signals synchronous to the clock signal, and the operating frequency controllable in response to changes in the load.

33. The coupled inductor regulator of claim 32, wherein the changes in the load include output current changes and output voltage changes.

34. The coupled inductor regulator of claim 23,
   wherein each of the at least two inductors includes a pair of series inductors, each pair having a common node between series inductors, and
   wherein each of the at least two means for conduction switching is in communication with the common node of a corresponding pair of series inductors.

35. The coupled inductor regulator of claim 34, wherein the at least two means for conduction switching, the pair of series inductors, and the at least two means for freewheeling switching are connected in a buck configuration, the buck configuration including two buck regulators each operating at approximately 50% duty cycle, each of the two buck regulators including:
   a means for conduction switching in communication with a means for freewheeling switching and the pair of series inductors, the means for conduction switching to communicate current during a conduction period from the source of input voltage through the pair of series inductors to the output, the means for freewheeling switching to provide a conduction path during one of the non-conduction periods for current flowing through one of the pair of series inductors to the output.

36. A coupled inductor regulator for converting energy from a source of input voltage to an output having an output voltage, comprising:
   at least two means for conduction switching to controllably conduct energy from the source of input voltage to the output;
   at least two inductors in communication with the at least two means for conduction switching, the at least two inductors wound together on a common core and each of the at least two inductors having a polarity such that DC currents in the at least two inductors cancel each other, the at least two inductors having a coefficient of coupling approximately equal to one;
   at least two means for freewheeling switching in communication with the at least two means for conduction switching to provide a path for current during non-conduction periods; and
   means for generating drive signals, the drive signals each having a duty cycle of approximately 50%, and the drive signals to control the at least two means for conduction switching, wherein each of the at least two inductors includes a pair of series inductors, each pair having a common node between series inductors, wherein each of the at least two means for conduction switching is in communication with the common node of a corresponding pair of series inductors, and wherein the at least two means for conduction switching, the at least two inductors, and the at least two means for freewheeling switching are connected in a boost configuration including two boost regulators each operating at approximately 50% duty cycle, each boost regulator including:

a means for conduction switching in communication with a means for freewheeling switching and an inductor, the means for conduction switching to communicate current during a conduction period from a high side of the source of input voltage through the inductor to a low side of the source of input voltage, the means for freewheeling switching to provide a conduction path during one of the non-conduction periods for current flowing from the high side of the source of input voltage through the inductor to the output.

37. The coupled inductor regulator of claim 34, wherein the at least two means for conduction switching, the at least two inductors, and the at least two means for freewheeling switching are connected in a flyback configuration including two flyback regulators each operating at approximately 50% duty cycle, each flyback regulator including:

a means for conduction switching in communication with a means for freewheeling switching and an inductor, the means for conduction switching to communicate current during a conduction period from a high side of the source of input voltage through the inductor to a low side of the source of input voltage, the means for freewheeling switching to provide a conduction path during one of the non-conduction periods for current flowing from the output through the inductor to the low side of the source of input voltage.

38. The coupled inductor regulator of claim 34, wherein each of the at least two inductors has a quantity of turns, and a turns ratio of the turns for each pair of series inductors is selected to set a voltage ratio of the output voltage divided by the input voltage.

39. The coupled inductor regulator of claim 38, wherein the at least two inductors each have approximately an equal quantity of turns such that the output voltage is approximately equal to one-fourth of the input voltage, and wherein the at least two means for conduction switching, the pair of series inductors, and the at least two means for freewheeling switching are connected in a buck configuration, the buck configuration including two buck regulators each operating at approximately 50% duty cycle, each of the two buck regulators including:

one of the at least two means for conduction switching in communication with one of the at least two means for freewheeling switching and the pair of series inductors, the one of the at least two means for conduction switching to communicate current during a conduction period from the source of input voltage through the pair of series inductors to the output, the one of the at least two means for freewheeling switching to provide a conduction path during one of the non-conduction periods for current flowing through one of the pair of series inductors to the output.

40. The coupled inductor regulator of claim 38, wherein the pair of series inductors include a first inductor in communication with one of the at least two means for conduction switching and a second inductor in communication with the output, wherein the turns ratio of the pair of series inductors is defined as a quantity of turns of the first inductor divided by a quantity of turns of the second inductor, and wherein the turns ratio of the pair of series inductors is approximately equal to one-half such that the voltage ratio is approximately one-third.

41. The coupled inductor regulator of claim 23, wherein the at least two means for freewheeling switching include synchronous rectifiers.

42. The coupled inductor regulator of claim 23, wherein the drive signals include multi-level switching to reduce switching losses.

43. The coupled inductor regulator of claim 23, included in a power system, the power system including:

means for low dropout regulating having a first output, the first output being the input voltage to the coupled inductor regulator; and a feedback signal connected from the output voltage of the coupled inductor regulator to the means for low dropout regulating, the means for low dropout regulating to regulate the first output in response to the feedback signal.

44. The coupled inductor regulator of claim 23, wherein the common core is made from a high permeability material.

45. The coupled inductor regulator of claim 44, wherein the common core is made from a ferrite.

46. A coupled inductor regulator for converting energy from a source of input voltage to an output having an output voltage, comprising:

at least two phase signals to control a conduction time;

at least two drivers, responsive to the at least two phase signals, to conduct energy from the source of input voltage; and a lattice network of coupled inductors in communication between the at least two drivers and the output, the lattice network having N stages wherein N is at least one, pairs of inductors within each of the N stages each having a coefficient of coupling approximately equal to one;

wherein the at least two phase signals each have a duty cycle of approximately 100%/2N, and wherein the output voltage is approximately equal to the input voltage divided by 2N.

47. The coupled inductor regulator of claim 46, wherein the at least two phase signals have a quantity approximately equal to 2N.

48. The coupled inductor regulator of claim 46, wherein the at least two drivers have a quantity approximately equal to 2N.

49. The coupled inductor regulator of claim 46, wherein the pairs of inductors of a stage of the lattice network are in communication with an inductor of a previous stage of the lattice network such that each stage of the lattice network has twice as many inductors as the previous stage.

50. The coupled inductor regulator of claim 46, wherein the pairs of inductors are each wound on corresponding single magnetic core structures.

51. The coupled inductor regulator of claim 46, wherein N is equal to two and the output voltage is approximately equal to one-fourth of the input voltage.

52. The coupled inductor regulator of claim 51, wherein the pairs of inductors are each wound on corresponding single magnetic core structures.

53. The coupled inductor regulator of claim 51, wherein the at least two phase signals are arranged in a timing sequence selected from a group consisting of sequential and alternating.

54. The coupled inductor regulator of claim 53, wherein an intermediate frequency of the lattice network with the alternating timing sequence is greater than the intermediate frequency of the lattice network with the sequential timing sequence.

55. A coupled inductor regulator for converting energy from a source of input voltage to an output having an output voltage, comprising:
at least two phase signals to control a conduction time;
at least two means for conducting, responsive to the at least two phase signals, to conduct energy from the source of input voltage; and
a lattice network of coupled inductors in communication between the at least two means for conducting and the output, the lattice network having N stages wherein N is at least one, pairs of the coupled inductors within each of the stages each having a coefficient of coupling approximately equal to one,
wherein the at least two phase signals each have a duty cycle of approximately 100%/2N, and
wherein the output voltage is approximately equal to the input voltage divided by 2N.

56. The coupled inductor regulator of claim 55, wherein the at least two phase signals have a quantity approximately equal to 2N.

57. The coupled inductor regulator of claim 55, wherein the at least two means for conducting have a quantity approximately equal to 2N.

58. The coupled inductor regulator of claim 55, wherein the pairs of inductors of a stage of the lattice network are in communication with an inductor of a previous stage of the lattice network such that each stage of the lattice network has twice as many inductors as the previous stage.

59. The coupled inductor regulator of claim 55, wherein the pairs of inductors are each wound on corresponding single means for magnetic coupling.

60. The coupled inductor regulator of claim 55, wherein N is equal to two and the output voltage is approximately equal to one-fourth of the input voltage.

61. The coupled inductor regulator of claim 60, wherein the pairs of inductors are each wound on corresponding single means for magnetic coupling.

62. The coupled inductor regulator of claim 60, wherein the at least two phase signals are arranged in a timing sequence selected from a group consisting of sequential and alternating.

63. The coupled inductor regulator of claim 62, wherein an intermediate frequency of the lattice network with the alternating timing sequence is greater than the intermediate frequency of the lattice network with the sequential timing sequence.

64. A coupled inductor regulator for converting energy from a source of input voltage to an output having an output voltage, comprising:
at least two conduction switches to conduct energy from the source of input voltage to the output;
at least two inductors in communication with the at least two conduction switches, the at least two inductors wound together on a common core and each of the at least two inductors having a polarity such that DC currents in the at least two inductors cancel each other, the at least two inductors having a coefficient of coupling approximately equal to one;
at least two freewheeling switches in communication with the at least two conduction switches to provide a path for current during non-conduction periods; and
a drive signal generator to generate drive signals each having a duty cycle of approximately 50%, the drive signals to control the at least two conduction switches,
wherein the at least two conduction switches include a first conduction switch that receives a first drive signal and a second conduction switch that receives a second drive signal,
wherein the at least two freewheeling switches include a first freewheeling switch that receives the second drive signal and a second freewheeling switch that receives the first drive signal, and
wherein the first and second drive signals are the same signal with a phase offset that is equal to 360 degrees divided by a number of the at least two conduction switches.

65. A coupled inductor regulator for converting energy from a source of input voltage to an output having an output voltage, comprising:
at least two conduction switches to conduct energy from the source of input voltage to the output;
at least two inductors in communication with the at least two conduction switches, the at least two inductors wound together on a common core and each of the at least two inductors having a polarity such that DC currents in the at least two inductors cancel each other, the at least two inductors having a coefficient of coupling approximately equal to one;
at least two freewheeling switches in communication with the at least two conduction switches to provide a path for current during non-conduction periods; and
a drive signal generator to generate drive signals each having a duty cycle of approximately 50%, the drive signals to control the at least two conduction switches,
wherein a first conduction time of one of the at least two conduction switches is separated from a second conduction time of another of the at least two conduction switches by non-conduction time, and
wherein a duration of the non-conduction time is substantially less than a duration of both the first conduction time and the second conduction time.

66. A coupled inductor regulator for converting energy from a source of input voltage to an output having an output voltage, comprising:
at least two means for conduction switching to controllably conduct energy from the source of input voltage to the output;
at least two inductors in communication with the at least two means for conduction switching, the at least two inductors wound together on a common core and each of the at least two inductors having a polarity such that DC currents in the at least two inductors cancel each other, the at least two inductors having a coefficient of coupling approximately equal to one;
at least two means for freewheeling switching in communication with the at least two means for conduction switching to provide a path for current during non-conduction periods; and
means for generating drive signals, the drive signals each having a duty cycle of approximately 50%, and the drive signals to control the at least two means for conduction switching,
wherein a first conduction time of one of the at least two means for conduction switching is separated from a second conduction time of another of the at least two means for conduction switching by non-conduction time, and wherein a duration of the non-conduction time is substantially less than a duration of both the first conduction time and the second conduction time.

67. The coupled inductor regulator of claim 23, wherein one of the at least two means for conduction switching receives a first drive signal, another of the at least two means for conduction switching receives a second drive signal, one of the at least two means for freewheeling switching receives the second drive signal, and another of the at least two means for freewheeling switching receives the first drive signal, and wherein the first and second drive signals are the same signal with a phase offset that is equal to 360 degrees divided by a number of the at least two conduction switches.

* * * * *